United States Patent
Annamalai et al.

(10) Patent No.: US 9,580,350 B2
(45) Date of Patent: Feb. 28, 2017

(54) HIGH HYDROXYL TIO$_2$-SIO$_2$ GLASS

(71) Applicant: Corning Incorporated, Corning, NY (US)

(72) Inventors: Sezhian Annamalai, Painted Post, NY (US); Carlos Alberto Duran, Ottawa (CA); Kenneth Edward Hrdina, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/921,487

(22) Filed: Oct. 23, 2015

(65) Prior Publication Data

US 2016/0137545 A1 May 19, 2016

Related U.S. Application Data

(60) Provisional application No. 62/081,641, filed on Nov. 19, 2014.

(51) Int. Cl.
*C03C 3/06* (2006.01)
*C03C 3/076* (2006.01)
(Continued)

(52) U.S. Cl.
CPC ............ *C03C 3/06* (2013.01); *C03B 19/06* (2013.01); *C03B 19/12* (2013.01);
(Continued)

(58) Field of Classification Search
CPC ............ C03C 2201/06; C03C 2201/23; C03C 2201/42; C03C 3/06
See application file for complete search history.

(56) References Cited

U.S. PATENT DOCUMENTS 4,337,295 A 6/1982 Rittler
6,319,867 B1 11/2001 Chacon et al.
(Continued)

FOREIGN PATENT DOCUMENTS

BE 682846 12/1966
DE 10349648 5/2005
(Continued)

OTHER PUBLICATIONS

International Search Report, issued in connection with corresponding PCT application No. PCT/US2015/061010, Mar. 18, 2016.
(Continued)

*Primary Examiner* — Noah Wiese
(74) *Attorney, Agent, or Firm* — Kevin L. Bray

(57) ABSTRACT

Ultralow expansion titania-silica glass. The glass has high hydroxyl content and optionally include one or more dopants. Representative optional dopants include boron, alkali elements, alkaline earth elements or metals such as Nb, Ta, Al, Mn, Sn Cu and Sn. The glass is prepared by a process that includes steam consolidation to increase the hydroxyl content. The high hydroxyl content or combination of dopant(s) and high hydroxyl content lowers the fictive temperature of the glass to provide a glass having a very low coefficient of thermal expansion (CTE), low fictive temperature ($T_f$), and low expansivity slope.

19 Claims, 4 Drawing Sheets

(51) Int. Cl.
*C03C 10/00* (2006.01)
*C03B 19/14* (2006.01)
*C03B 19/06* (2006.01)
*C03B 19/12* (2006.01)
*C03B 32/00* (2006.01)

(52) U.S. Cl.
CPC .......... *C03B 19/1453* (2013.01); *C03B 32/00* (2013.01); *C03C 3/076* (2013.01); *C03C 10/0009* (2013.01); *C03B 2201/10* (2013.01); *C03B 2201/23* (2013.01); *C03B 2201/30* (2013.01); *C03B 2201/32* (2013.01); *C03B 2201/40* (2013.01); *C03B 2201/42* (2013.01); *C03B 2201/50* (2013.01); *C03B 2201/54* (2013.01); *C03C 2201/10* (2013.01); *C03C 2201/23* (2013.01); *C03C 2201/30* (2013.01); *C03C 2201/32* (2013.01); *C03C 2201/40* (2013.01); *C03C 2201/42* (2013.01); *C03C 2201/50* (2013.01); *C03C 2201/54* (2013.01); *C03C 2201/58* (2013.01); *C03C 2203/54* (2013.01)

(56) References Cited

U.S. PATENT DOCUMENTS

| | | | |
|---|---|---|---|
| 7,534,734 B2 | 5/2009 | Ellison | |
| 7,981,824 B2* | 7/2011 | Englisch | C03B 19/1469 501/54 |
| 7,989,378 B2* | 8/2011 | Koike | C03B 19/1453 501/54 |
| 8,012,653 B2 | 9/2011 | Koike | |
| 8,034,731 B2* | 10/2011 | Koike | C03B 19/1453 501/54 |
| 8,093,165 B2 | 1/2012 | Koike | |
| 2006/0179879 A1* | 8/2006 | Ellison | C03B 19/1415 65/17.4 |
| 2007/0190340 A1 | 8/2007 | Coppola et al. | |
| 2010/0028787 A1 | 2/2010 | Koike | |
| 2010/0317505 A1 | 12/2010 | Koike | |
| 2010/0323872 A1* | 12/2010 | Koike | B82Y 10/00 501/53 |
| 2011/0207592 A1 | 8/2011 | Duran | |
| 2011/0207593 A1 | 8/2011 | Duran | |
| 2012/0135852 A1 | 5/2012 | Ellison et al. | |
| 2012/0238434 A1 | 9/2012 | Koike | |
| 2012/0264584 A1 | 10/2012 | Miyasaka | |
| 2012/0308803 A1 | 12/2012 | Dejneka et al. | |
| 2013/0047669 A1 | 2/2013 | Annamalai | |
| 2013/0052391 A1 | 2/2013 | Annamalai | |

FOREIGN PATENT DOCUMENTS

| | | |
|---|---|---|
| DE | 102004060600 | 7/2005 |
| EP | 2003098 | 12/2008 |
| EP | 2468692 | 6/2012 |
| EP | 2518030 | 10/2012 |
| FR | 1484178 | 9/1967 |
| JP | 2010163347 | 7/2010 |
| JP | 2011051534 | 3/2011 |
| WO | 02/088036 | 11/2002 |
| WO | 2009128560 | 10/2009 |
| WO | 2011068064 | 6/2011 |
| WO | 2013130718 | 9/2013 |
| WO | 2014085529 | 6/2014 |

OTHER PUBLICATIONS

A.P. Carapella, C.A. Duran, K.E. Hrdina, D.J. Sears, and J.E. Tingley, "ULE Glass for EUVL Applications, a Fictive Temperature Correlation", J. Non-Crystalline Solids, vol. 367, 37-42 (2013).

J.C. Mauro, "Statistics of Modifier Distributions in Mixed Network Glasses," J. Chem. Phys. 138, 12A522 (2013).

Kliment'eva et al. A Study of the Aluminum'Chromium Phosphate Binder Based on the Slurry (Slime) Orthophosphoric Acid. V. A. Kucherenko Central Scientific-Research Institute TsNIISK. Translated from Ogneupory, No. 8, pp. 26-31, Aug. 1986.

* cited by examiner

HIGH HYDROXYL TIO$_2$-SIO$_2$ GLASS

This application claims the benefit of priority under 35 U.S.C. §119 of U.S. Provisional Application Ser. No. 62/081,641 filed on Nov. 19, 2014 the content of which is relied upon and incorporated herein by reference in its entirety.

FIELD

This description pertains to titania-silica glass suitable for EUV lithography. More particularly, this description relates to titania-silica glasses having high hydroxyl content and optionally one or more dopants. The glasses possess low coefficients of thermal expansion and low expansivity slopes.

BACKGROUND

Extreme Ultraviolet Lithography (EUVL) is an emerging lithography technology for the 22 nm node and beyond for MPU/DRAMs [MPU—Micro Processing Unit & DRAM—Dynamic Random Access Memory). The scanners needed to support EUV lithography have been developed and are currently in use on a limited scale to demonstrate the potential of this new technology. Key components of EUVL scanners include reflective optics for directing and controlling exposure light from an EUV source to enable patterning of features on silicon wafers. The reflecting optic elements typically include a substrate with a series of coating layers. Due to the short wavelength of EUV exposure light (e.g. 13.5 nm) and the high powers needed for high throughput processing of wafers, significant heating of the reflecting optic elements can occur. In order to avoid distortions in the patterns transferred to the wafers, it is necessary for the reflecting optic elements to maintain constant performance over a wide range of temperature. The requirement for temperature-stable performance has motivated the development of low thermal expansion materials for use as substrate materials for optics in EUVL scanners.

Initially, glass-ceramic materials were considered as substrate materials for EUV optics. Glass-ceramic materials, however, proved to be inadequate and have been replaced by low expansion titania-silica glass (such as ULE® glass from Corning Incorporated). The advantages of ULE® titania-silica glass include polishability to an extremely flat finish, low coefficient of thermal expansion (CTE), and dimensional stability over a range of temperatures. The roadmap for semiconductor technology calls for ever decreasing feature sizes and ever increasing demands on lithography systems. In order to meet the challenges needed to advance the capabilities of lithography systems, it is necessary to develop new materials for scanner optics that are increasingly insensitive to thermal effects.

SUMMARY

The present disclosure provides improved glasses for EUVL optical systems. The glasses feature low CTE (coefficient of thermal expansion) and low CTE slope. The CTE and CTE slope of the glasses represent significant improvements over the CTE and CTE slope of the conventional binary titania-silica glass (TiO$_2$—SiO$_2$) that is currently used in EUVL optical systems. The glasses of the present disclosure are modified titania-silica glasses that include high hydroxyl (OH) concentration. The glasses may optionally further include one or more dopants. The improvement in CTE and CTE slope observed in the present modified titania-silica glass exceed the improvement possible for conventional titania-silica glasses through adjustment of annealing cycle alone. Alternatively, a targeted reduction in CTE slope can be obtained with the modified titania-silica glass in fewer or faster annealing cycles than is possible with conventional titania-silica glass. As a result, manufacturing cost and time are greatly reduced.

The improved thermal properties of the present glass are accomplished via a combination of compositional and structural changes. Compositionally, the glass is a titania-silica glass that has been modified to include a high concentration of hydroxyl groups. The high concentration of hydroxyl groups is achieved by consolidation of soot blanks of titania-silica in a steam-containing atmosphere. The steam-containing atmosphere may include only steam or steam in combination with other gases. Other gases may include He and/or O$_2$. When present, the partial pressure of O$_2$ in the steam-containing atmosphere is less than 0.2 atm, or less than 0.1 atm, or less than 0.05 atm, or less than 0.02 atm.

When the steam-containing atmosphere includes only steam, the pressure of steam may be up to 10 atmosphere, such as a pressure of 0.1 atm to 10 atm, or a pressure of 0.5 atm to 5.0 atm, or a pressure of 0.7 atm to 2.5 atm, or a pressure of 0.9 to 1.3 atm. When the steam—containing atmosphere includes steam in combination with one or more other gases, the total pressure of the steam-containing atmosphere may be up to 10 atm, such as a total pressure of 10 atm or less, or a total pressure of 7.5 atm or less, or a total pressure of 5.0 atm or less, or a total pressure of 2.5 atm or less, or a total pressure of 1.5 atm or less, or a total pressure of 1.0 atm or less. When the steam-containing atmosphere includes steam in combination with other gases, the total pressure of the steam-containing atmosphere may be up to 10 atm and the partial pressure of steam may 0.1 atm to 9.5 atm, or 1.5 atm to 5.0 atm, or 0.7 atm to 2.5 atm, or 0.9 to 1.3 atm. When the steam-containing atmosphere includes steam in combination with other gases, the steam-containing atmosphere may include at least 10 vol % steam, or at least 25 vol % steam, or at least 50 vol % steam, or at least 75 vol % steam, or at least 90 vol % steam, or 90 vol % to 99 vol % steam. In one embodiment, the steam-containing atmosphere is at a pressure of up to 10 atm and includes 10 vol % steam. In another embodiment, the steam-containing atmosphere is at a pressure of up to 10 atm and includes 50 vol % steam. In still another embodiment, the steam-containing atmosphere is at a pressure of up to 10 atm and includes 75 vol % steam. In yet another embodiment, the steam-containing atmosphere is at a pressure of 0.9 atm to 1.3 atm and includes 90 vol % to 100 vol % steam.

The glass may optionally include one or more dopants. Representative dopants include B, Li, Na, K, Ca, Mg, Nb, Ta, Al, Cu, Sn and Mn. The combined concentration of the one or more dopants in the glass may be 0.1 wt % to 2.0 wt %, or 0.1 wt % to 7.0 wt %, or 0.2 wt % to 5.0 wt %. The combined concentration of one or more of the dopants Li, Na and K may be 0.1 wt % to 2.0 wt %. The combined concentration of one or more of the dopants B, Ca, Mg, Nb, Ta, Al, Cu, Sn and Mn may be 0.1 wt % to 7.0 wt %, or 0.2 wt % to 5.0 wt %.

Structurally, the annealing cycle is controlled to yield a desired glass structure and a desired fictive temperature. Annealing may include heating for at least one hour at an elevated temperature of at least 850° C., or at least 900° C., or at least 950° C., or at least 1000° C. After heating at the elevated temperature, the glass may be cooled at a controlled rate between 0.1° C./hr and 30° C./hr, or between 0.2° C./hr and 20° C./hr, or between 0.3° C./hr and 10° C./hr, or between 0.3° C./hr and 5° C./hr, or between 0.1° C./hr and 5° C./hr, or between 0.1° C./hr and 3° C./hr, or between 0.1° C./hr and 1.5° C./hr to a temperature below 750° C., or below 700° C., or below 650° C. After cooling at a controlled rate to a temperature below 750° C., or below 700° C., or below 650° C., the glass may be further cooled to room temperature naturally.

The present description extends to:

A glass comprising 9.0 wt % to 16.0 wt % TiO$_2$; 84.0 wt % to 91.0 wt % SiO$_2$; and 900 ppm to 3000 ppm OH, or 1000 ppm to 2000 ppm OH, or 1150 ppm to 1700 ppm OH.

The present description extends to:

A glass comprising 9.5 wt % to 16.0 wt % TiO$_2$; 84.0 wt % to 90.5 wt % SiO$_2$; and 900 ppm to 3000 ppm OH, or 1000 ppm to 2000 ppm OH, or 1150 ppm to 1700 ppm OH.

The present description extends to:

A glass comprising 10.0 wt % to 15.0 wt % TiO$_2$; 85.0 wt % to 90.0 wt % SiO$_2$; and 900 ppm to 3000 ppm OH, or 1000 ppm to 2000 ppm OH, or 1150 ppm to 1700 ppm OH.

The present description extends to:

A glass comprising 11.0 wt % to 14.0 wt % TiO$_2$; 86.0 wt % to 89.0 wt % SiO$_2$; and 900 ppm to 3000 ppm OH, or 1000 ppm to 2000 ppm OH, or 1150 ppm to 1700 ppm OH.

The present description extends to:

A glass comprising 9.0 wt % to 16.0 wt % TiO$_2$; a combined concentration of 0.1 wt % to 7.0 wt % or 0.2 wt % to 5.0 wt % of one or more dopants selected from the group consisting of B, Al, Li, Na, K, Mg, Ca, Nb, Ta, Mn, Cu and Sn; 900 ppm to 3000 ppm OH, or 1000 ppm to 2000 ppm OH, or 1150 ppm to 1700 ppm OH; and the remainder SiO$_2$.

The present description extends to:

A glass comprising 9.0 wt % to 16.0 wt % TiO$_2$; a combined concentration of 0.1 wt % to 7.0 wt % or 0.2 wt % to 5.0 wt % of one or more dopants selected from the group consisting of B, Al, Mg, Ca, Nb, Ta, Mn, Cu and Sn; 900 ppm to 3000 ppm OH, or 1000 ppm to 2000 ppm OH, or 1150 ppm to 1700 ppm OH; and the remainder SiO$_2$.

The present description extends to:

A glass comprising 9.0 wt % to 16.0 wt % TiO$_2$; a combined concentration of 0.1 wt % to 2.0 wt % of one or more dopants selected from the group consisting of Li, Na, and K; 900 ppm to 3000 ppm OH, or 1000 ppm to 2000 ppm OH, or 1150 ppm to 1700 ppm OH; and the remainder SiO$_2$.

The present description extends to:

A glass comprising 9.5 wt % to 16.0 wt % TiO$_2$; a combined concentration of 0.1 wt % to 7.0 wt % or 0.2 wt % to 5.0 wt % of one or more dopants selected from the group consisting of B, Al, Li, Na, K, Mg, Ca, Nb, Ta, Mn, Cu and Sn; 900 ppm to 3000 ppm OH, or 1000 ppm to 2000 ppm OH, or 1150 ppm to 1700 ppm OH; and the remainder SiO$_2$.

The present description extends to:

A glass comprising 9.5 wt % to 16.0 wt % TiO$_2$; a combined concentration of 0.1 wt % to 7.0 wt % or 0.2 wt % to 5.0 wt % of one or more dopants selected from the group consisting of B, Al, Mg, Ca, Nb, Ta, Mn, Cu and Sn; 900 ppm to 3000 ppm OH, or 1000 ppm to 2000 ppm OH, or 1150 ppm to 1700 ppm OH; and the remainder SiO$_2$.

The present description extends to:

A glass comprising 9.5 wt % to 16.0 wt % TiO$_2$; a combined concentration of 0.1 wt % to 2.0 wt % of one or more dopants selected from the group consisting of Li, Na, and K; 900 ppm to 3000 ppm OH, or 1000 ppm to 2000 ppm OH, or 1150 ppm to 1700 ppm OH; and the remainder SiO$_2$.

The present description extends to:

A glass comprising 10.0 wt % to 15.0 wt % TiO$_2$; a combined concentration of 0.1 wt % to 7.0 wt % or 0.2 wt % to 5.0 wt % of one or more dopants selected from the group consisting of B, Al, Li, Na, K, Mg, Ca, Nb, Ta, Mn, Cu and Sn; 900 ppm to 3000 ppm OH, or 1000 ppm to 2000 ppm OH, or 1150 ppm to 1700 ppm OH; and the remainder SiO$_2$.

The present description extends to:

A glass comprising 10.0 wt % to 15.0 wt % TiO$_2$; a combined concentration of 0.1 wt % to 7.0 wt % or 0.2 wt % to 5.0 wt % of one or more dopants selected from the group consisting of B, Al, Mg, Ca, Nb, Ta, Mn, Cu and Sn; 900 ppm to 3000 ppm OH, or 1000 ppm to 2000 ppm OH, or 1150 ppm to 1700 ppm OH; and the remainder SiO$_2$.

The present description extends to:

A glass comprising 10.0 wt % to 15.0 wt % TiO$_2$; a combined concentration of 0.1 wt % to 2.0 wt % of one or more dopants selected from the group consisting of Li, Na, and K; 900 ppm to 3000 ppm OH, or 1000 ppm to 2000 ppm OH, or 1150 ppm to 1700 ppm OH; and the remainder SiO$_2$.

The present description extends to:

A glass comprising 11.0 wt % to 14.0 wt % TiO$_2$; a combined concentration of 0.1 wt % to 7.0 wt % or 0.2 wt % to 5.0 wt % of one or more dopants selected from the group consisting of B, Al, Li, Na, K, Mg, Ca, Nb, Ta, Mn, Cu and Sn; 900 ppm to 3000 ppm OH, or 1000 ppm to 2000 ppm OH, or 1150 ppm to 1700 ppm OH; and the remainder SiO$_2$.

The present description extends to:

A glass comprising 11.0 wt % to 14.0 wt % TiO$_2$; a combined concentration of 0.1 wt % to 7.0 wt % or 0.2 wt % to 5.0 wt % of one or more dopants selected from the group consisting of B, Al, Mg, Ca, Nb, Ta, Mn, Cu and Sn; 900 ppm to 3000 ppm OH, or 1000 ppm to 2000 ppm OH, or 1150 ppm to 1700 ppm OH; and the remainder SiO$_2$.

The present description extends to:

A glass comprising 11.0 wt % to 14.0 wt % TiO$_2$; a combined concentration of 0.1 wt % to 2.0 wt % of one or more dopants selected from the group consisting of Li, Na, and K; 900 ppm to 3000 ppm OH, or 1000 ppm to 2000 ppm OH, or 1150 ppm to 1700 ppm OH; and the remainder SiO$_2$.

The present description extends to:

A method of preparing a titania-silica glass comprising:
preparing a soot blank, said soot blank comprising 9.0 wt % to 16.0 wt % TiO$_2$ and 84.0 wt % to 91.0 wt % SiO$_2$; and
consolidating said soot blank to form a consolidated soot blank, said consolidating including heating said soot blank at a temperature in the range from 200° C. to 1700° C. in a steam-containing atmosphere at a pressure in the range from 0.1 atm to 10 atm; and
annealing said consolidated soot blank, said annealing including maintaining said consolidated soot blank at an annealing temperature of at least 850° C.;
cooling said consolidated soot blank from said annealing temperature to a temperature below 750° C. at a rate between 0.1° C./hr and 30° C./hr.

The present description extends to:

A method of preparing a titania-silica glass comprising:
preparing a soot blank, said soot blank comprising 9.0 wt % to 16.0 wt % TiO$_2$, a combined concentration of 0.1 wt % to 7.0 wt % of one or more dopants selected from the group consisting of B, Al, Li, Na, K, Mg, Ca, Nb, Ta, Mn, Cu and Sn, and the remainder SiO$_2$; and
consolidating said soot blank to form a consolidated soot blank, said consolidating including heating said soot blank at a temperature in the range from 200° C. to 1700° C. in a steam-containing atmosphere at a pressure in the range from 0.1 atm to 10 atm; and annealing said consolidated soot blank, said annealing including maintaining said consolidated soot blank at an annealing temperature of at least 850° C.;

cooling said consolidated soot blank from said annealing temperature to a temperature below 750° C. at a rate between 0.1° C./hr and 30° C./hr.

The present description extends to:

A method of preparing a titania-silica glass comprising:

preparing a soot blank, said soot blank comprising 9.0 wt % to 16.0 wt % $TiO_2$ and 84.0 wt % to 91.0 wt % $SiO_2$; and consolidating said soot blank to form a consolidated soot blank, said consolidating including heating said soot blank at a temperature in the range from 200° C. to 900° C. in a steam-containing atmosphere at a pressure in the range from 0.1 atm to 10 atm;

annealing said consolidated soot blank, said annealing including maintaining said consolidated soot blank at an annealing temperature of at least 850° C.; and cooling said consolidated soot blank from said annealing temperature to a temperature below 750° C. at a rate between 0.1° C./hr and 30° C./hr.

The present description extends to:

A method of preparing a titania-silica glass comprising:

preparing a soot blank, said soot blank comprising 9.0 wt % to 16.0 wt % $TiO_2$, a combined concentration of 0.1 wt % to 7.0 wt % of one or more dopants selected from the group consisting of B, Al, Li, Na, K, Mg, Ca, Nb, Ta, Mn, Cu and Sn, and the remainder $SiO_2$; and consolidating said soot blank to form a consolidated soot blank, said consolidating including heating said soot blank at a temperature in the range from 200° C. to 900° C. in a steam-containing atmosphere at a pressure in the range from 0.1 atm to 10 atm;

annealing said consolidated soot blank, said annealing including maintaining said consolidated soot blank at an annealing temperature of at least 850° C.; and cooling said consolidated soot blank from said annealing temperature to a temperature below 750° C. at a rate between 0.1° C./hr and 30° C./hr.

The present description extends to:

A method of preparing a titania-silica glass comprising:

preparing a soot blank, said soot blank comprising 9.0 wt % to 16.0 wt % $TiO_2$, a combined concentration of 0.1 wt % to 7.0 wt % of one or more dopants selected from the group consisting of B, Al, Li, Na, K, Mg, Ca, Nb, Ta, Mn, Cu and Sn, and the remainder $SiO_2$;

heating said soot blank in a steam-free atmosphere, said steam-free atmosphere having a temperature in the range from room temperature to 900° C.;

exposing said soot blank to a steam-containing atmosphere, said steam-containing atmosphere having a temperature less than 900° C.; and heating said soot blank in said steam-containing atmosphere to a temperature of at least 1000° C.

The present description extends to:

A method of preparing a titania-silica glass comprising:

preparing a soot blank, said soot blank comprising 9.0 wt % to 16.0 wt % $TiO_2$, a combined concentration of 0.1 wt % to 7.0 wt % of one or more dopants selected from the group consisting of B, Al, Li, Na, K, Mg, Ca, Nb, Ta, Mn, Cu and Sn, and the remainder $SiO_2$;

heating said soot blank in a steam-free atmosphere, said steam-free atmosphere having a temperature in the range from 100° C. to 600° C.;

exposing said soot blank to a steam-containing atmosphere, said steam-containing atmosphere having a temperature in the range from 900° C.-1300° C.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the description, it is believed that the description will be better understood from the following specification when taken in conjunction with the accompanying drawings, wherein:

DETAILED DESCRIPTION

Figure 1:
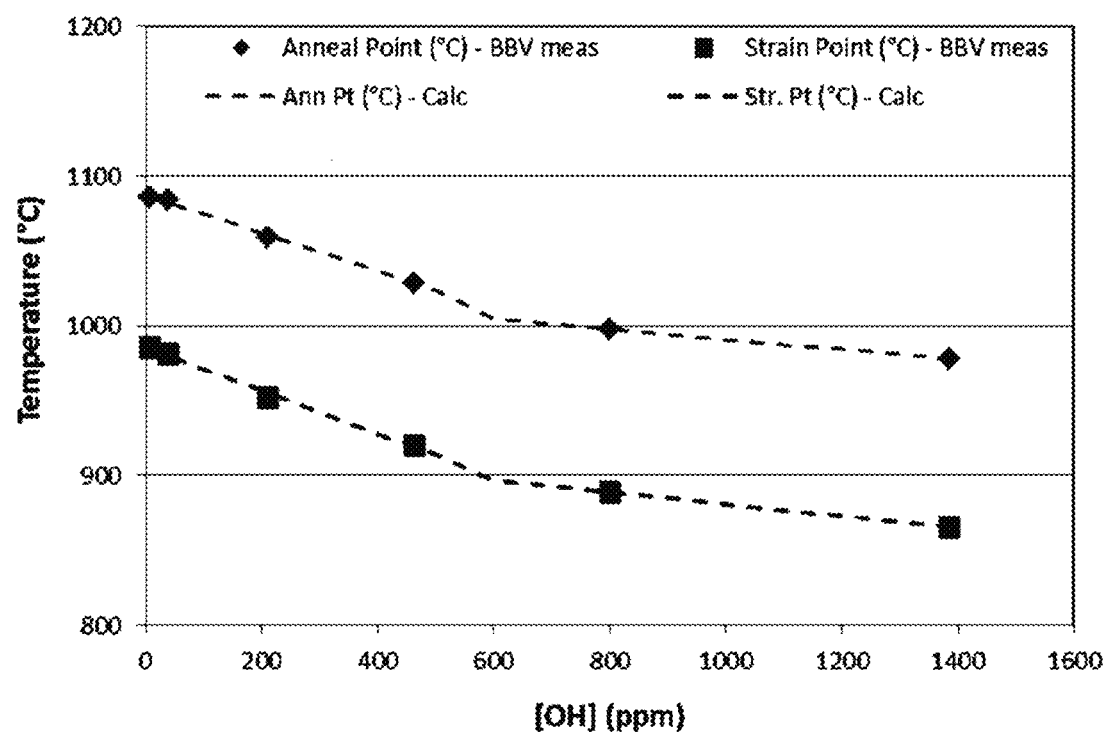
FIG. 1 shows the dependence of strain point (■) and anneal point (♦) on hydroxyl (OH) concentration for a series of titania-silica glasses.

Low CTE (coefficient of thermal expansion; also referred to herein as expansivity) and low CTE slope (slope of the functional dependence of CTE on temperature, also referred to herein as expansivity slope) are important requirements for materials used as blanks (substrates) for mirrors in optics and photomasks for EUVL steppers. Materials with reduced CTE slope provide improved thermal and dimensional stability and will accordingly enable use of higher power sources in EUVL systems. Higher power EUV exposure sources will lead to higher productivity (wafer throughput) in EUVL processing.

The illustrated embodiments provide modified titania-silica glasses that feature low CTE slope and high spatial uniformity of fictive temperature ($T_f$), CTE, CTE slope, and/or zero crossover temperature ($T_{zc}$). The modified titania-silica glasses are excellent substrate materials for mirrors, other optics and photomasks in EUVL processing systems as well as in other applications where superior thermal and dimensional stability of materials is required. In addition, the modified titania-silica glasses can be configured in smaller volumes and used as an insert in the critical zone of a mirror blank for projection optics. Mirrors used in projection optics can have a diameter in the range of 10 cm to 60 cm, and may become even larger in the future. The overall cost of the mirror can be reduced by identifying the critical zone of the mirror substrate and limiting use of more specialized low CTE materials to the limited portion of the substrate that is critical to performance. The balance of the substrate can remain as conventional titania-silica glass. The use of inserts in the critical zone of EUVL systems elements is disclosed in commonly owned U.S. Patent Application Publication Nos. 20130047669A1 and 20130052391A1, the disclosures of which are incorporated by reference herein.

The present disclosure provides improved glasses for EUVL optical systems. The glasses feature low CTE and low CTE slope. The CTE and CTE slope of the glasses represent significant improvements over the CTE and CTE slope of the conventional binary titania-silica glass ($TiO_2$—$SiO_2$) that is currently used in EUVL optical systems. The glasses of the present disclosure are modified titania-silica glasses that include high hydroxyl (OH) concentration. The glasses may optionally further include one or more dopants. The improvement in CTE and CTE slope observed in the present modified titania-silica glass exceed the improvement possible for conventional titania-silica glasses through adjustment of annealing cycle alone. Alternatively, a targeted reduction in CTE slope can be obtained with the modified titania-silica glass in fewer or faster annealing cycles than is possible with conventional titania-silica glass. As a result, manufacturing cost and time are greatly reduced.

The improved thermal properties of the present glass are accomplished via a combination of compositional and structural changes. Compositionally, the glass is a titania-silica glass that has been modified to include a high concentration of hydroxyl groups. The glass may optionally include one or more dopants. Representative dopants include B, Li, Na, K, Ca, Mg, Nb, Ta, Al, Cu, Sn and Mn. The concentration of components of the present glass compositions is expressed herein in units of weight percent (wt %) or parts per million by weight (ppm).

Structurally, the annealing cycle is controlled to yield a desired glass structure(s). It is known that annealing can provide structural improvements in conventional titania-silica glass that lead to a reduction in expansivity slope of up to 40%. Further reductions in expansivity slope are possible when annealing the compositionally modified titania-silica glasses of the present disclosure. Additionally, through control of the annealing cycle, it is possible to obtain a highly uniform spatial distribution of fictive temperature ($T_f$), CTE, and crossover temperature ($T_{ZC}$) in the modified titania-silica glasses.

The following description refers to various thermal treatments that include steps of heating and cooling from, to, or between specified temperatures at specified heating or cooling rates and/or for specified times. Unless otherwise specified, temperatures and rates of heating or cooling refer to conditions of operation of the furnace in which the thermal treatment occurs. Reference to heating (or cooling) and heating a glass (or cooling a glass) to a particular temperature means that the conditions of the furnace are set to provide the particular temperature. Similarly, reference to a particular heating rate (or rate of heating) or a particular cooling rate (or rate of cooling) means that the conditions of the furnace are set to provide the particular heating rate or particular cooling rate. It is understood and recognized by those of skill in the art, however, that there may be a lag time between setting the temperature or rate of heating or cooling of the furnace and the time at which the conditions of the glass match the furnace settings. As a result, the actual conditions at the glass may deviate from furnace conditions.

In one embodiment, the glass contains 9.0 wt % to 16.0 wt % $TiO_2$, 84.0 wt % to 91.0 wt % $SiO_2$, and 900 ppm to 3000 ppm OH. In another embodiment, the glass contains 9.0 wt % to 16.0 wt % $TiO_2$, 84.0 wt % to 91.0 wt % $SiO_2$, and 1000 ppm to 2000 ppm OH. In still another embodiment, the glass contains 9.0 wt % to 16.0 wt % $TiO_2$, 84.0 wt % to 91.0 wt % $SiO_2$, and 1100 ppm to 1800 ppm OH. In yet another embodiment, the glass contains 9.0 wt % to 16.0 wt % $TiO_2$, 84.0 wt % to 91.0 wt % $SiO_2$, and 1150 ppm to 1700 ppm OH.

In one embodiment, the glass contains 9.5 wt % to 16.0 wt % $TiO_2$, 84.0 wt % to 90.5 wt % $SiO_2$, and 900 ppm to 3000 ppm OH. In another embodiment, the glass contains 9.5 wt % to 16.0 wt % $TiO_2$, 84.0 wt % to 90.5 wt % $SiO_2$, and 1000 ppm to 2000 ppm OH. In still another embodiment, the glass contains 9.5 wt % to 16.0 wt % $TiO_2$, 84.0 wt % to 90.5 wt % $SiO_2$, and 1100 ppm to 1800 ppm OH. In yet another embodiment, the glass contains 9.5 wt % to 16.0 wt % $TiO_2$, 84.0 wt % to 90.5 wt % $SiO_2$, and 1150 ppm to 1700 ppm OH.

In one embodiment, the glass contains 10.0 wt % to 15.0 wt % $TiO_2$, 85.0 wt % to 90.0 wt % $SiO_2$, and 900 ppm to 3000 ppm OH. In another embodiment, the glass contains 10.0 wt % to 15.0 wt % $TiO_2$, 85.0 wt % to 90.0 wt % $SiO_2$, and 1000 ppm to 2000 ppm OH. In still another embodiment, the glass contains 10.0 wt % to 15.0 wt % $TiO_2$, 85.0 wt % to 90.0 wt % $SiO_2$, and 1100 ppm to 1800 ppm OH. In yet another embodiment, the glass contains 10.0 wt % to 15.0 wt % $TiO_2$, 85.0 wt % to 90.0 wt % $SiO_2$, and 1150 ppm to 1700 ppm OH.

In one embodiment, the glass contains 11.0 wt % to 14.0 wt % $TiO_2$, 86.0 wt % to 89.0 wt % $SiO_2$, and 900 ppm to 3000 ppm OH. In another embodiment, the glass contains 11.0 wt % to 14.0 wt % $TiO_2$, 86.0 wt % to 89.0 wt % $SiO_2$, and 1000 ppm to 2000 ppm OH. In still another embodiment, the glass contains 11.0 wt % to 14.0 wt % $TiO_2$, 86.0 wt % to 89.0 wt % $SiO_2$, and 1100 ppm to 1800 ppm OH. In yet another embodiment, the glass contains 11.0 wt % to 14.0 wt % $TiO_2$, 86.0 wt % to 89.0 wt % $SiO_2$, and 1150 ppm to 1700 ppm OH.

In one embodiment, the glass contains 9.0 wt % to 16.0 wt % $TiO_2$, 900 ppm to 3000 ppm OH, and the remainder $SiO_2$. In another embodiment, the glass contains 9.0 wt % to 16.0 wt % $TiO_2$, 1000 ppm to 2000 ppm OH, and the remainder $SiO_2$. In still another embodiment, the glass contains 9.0 wt % to 16.0 wt % $TiO_2$, 1100 ppm to 1800 ppm OH, and the remainder $SiO_2$. In yet another embodiment, the glass contains 9.0 wt % to 16.0 wt % $TiO_2$, 1150 ppm to 1700 ppm OH, and the remainder $SiO_2$.

In one embodiment, the glass contains 10.0 wt % to 15.0 wt % $TiO_2$, 900 ppm to 3000 ppm OH, and the remainder $SiO_2$. In another embodiment, the glass contains 10.0 wt % to 15.0 wt % $TiO_2$, 1000 ppm to 2000 ppm OH, and the remainder $SiO_2$. In still another embodiment, the glass contains 10.0 wt % to 15.0 wt % $TiO_2$, 1100 ppm to 1800 ppm OH, and the remainder $SiO_2$. In yet another embodiment, the glass contains 10.0 wt % to 15.0 wt % $TiO_2$, 1150 ppm to 1700 ppm OH, and the remainder $SiO_2$.

In one embodiment, the glass contains 11.0 wt % to 14.0 wt % $TiO_2$, 900 ppm to 3000 ppm OH, and the remainder $SiO_2$. In another embodiment, the glass contains 11.0 wt % to 14.0 wt % $TiO_2$, 1000 ppm to 2000 ppm OH, and the remainder $SiO_2$. In still another embodiment, the glass contains 11.0 wt % to 14.0 wt % $TiO_2$, 1100 ppm to 1800 ppm OH, and the remainder $SiO_2$. In yet another embodiment, the glass contains 11.0 wt % to 14.0 wt % $TiO_2$, 1150 ppm to 1700 ppm OH, and the remainder $SiO_2$.

Modification of the composition to include high hydroxyl concentration leads to a reduction in viscosity. The reduction in viscosity promotes more complete structural relaxation upon cooling and provides a glass having a lower fictive temperature. The fictive temperature of titania-silica glasses is believed to correlate with expansivity slope. Low fictive temperatures lead to low expansivity slopes. It is accordingly desirable to identify glass compositions that are capable of being annealed or otherwise processed to states having low fictive temperatures.

In certain embodiments, additional decreases in viscosity and fictive temperature may occur when the high hydroxyl titania-silica glasses are further modified to include a dopant. Representative dopants include B, Al, alkali elements (e.g. Li, Na, K), alkaline earth elements (e.g. Mg, Ca), transition metal elements (e.g. Nb, Ta, Mn, Cu, Sn). The glass may include a single dopant or a combination of two or more dopants.

In one embodiment, any of the hydroxyl-containing titania-silica glasses disclosed herein includes a single dopant selected from the group consisting of B, Al, Li, Na, K, Mg, Ca, Nb, Ta, Mn, Cu and Sn and the concentration of the dopant is 0.1 wt % to 7.0 wt %, or 0.2 wt % to 5.0 wt %, or 0.3 wt % to 3.0 wt %.

In another embodiment, any of the hydroxyl-containing titania-silica glasses disclosed herein includes a single dopant selected from the group consisting of B, Al, Mg, Ca, Nb, Ta, Mn, Cu and Sn and the concentration of the dopant is 0.1 wt % to 7.0 wt %, or 0.2 wt % to 5.0 wt %, or 0.3 wt % to 3.0 wt %.

In still another embodiment, any of the hydroxyl-containing titania-silica glasses disclosed herein includes a single dopant selected from the group consisting of Li, Na, and K and the concentration of the dopant is 0.1 wt % to 2.0 wt %, or 0.2 wt % to 1.0 wt %.

In one embodiment, any of the hydroxyl-containing titania-silica glasses disclosed herein includes a combination of two or more dopants selected from the group consisting of B, Al, Li, Na, K, Mg, Ca, Nb, Ta, Mn, Cu and Sn and the combined concentration of the two or more dopants is 0.1 wt % to 7.0 wt %, or 0.2 wt % to 5.0 wt %, or 0.3 wt % to 3.0 wt %.

In one embodiment, any of the hydroxyl-containing titania-silica glasses disclosed herein includes a combination of two or more dopants selected from the group consisting of B, Al, Mg, Ca, Nb, Ta, Mn, Cu and Sn and the combined concentration of the two or more dopants is 0.1 wt % to 7.0 wt %, or 0.2 wt % to 5.0 wt %, or 0.3 wt % to 3.0 wt %.

In one embodiment, any of the hydroxyl-containing titania-silica glasses disclosed herein includes a combination of two or more dopants selected from the group consisting of Li, Na, and K and the combined concentration of the two or more dopants is 0.1 wt % to 2.0 wt %, or 0.2 wt % to 1.0 wt %.

In one embodiment, the glass contains 9.0 wt % to 16.0 wt % $TiO_2$, a combined concentration of 0.1 to 7.0 wt % of one or more dopants selected from the group consisting of B, Al, Li, Na, K, Mg, Ca, Nb, Ta, Mn, Cu and Sn, 900 ppm to 3000 ppm OH, and the remainder $SiO_2$. In another embodiment, the glass contains 9.0 wt % to 16.0 wt % $TiO_2$; 1000 ppm to 2000 ppm OH; a combined concentration of 0.1 to 7.0 wt % of one or more dopants selected from the group consisting of B, Al, Li, Na, K, Mg, Ca, Nb, Ta, Mn, Cu and Sn; and the remainder $SiO_2$. In still another embodiment, the glass contains 9.0 wt % to 16.0 wt % $TiO_2$; 1100 ppm to 1800 ppm OH; a combined concentration of 0.1 to 7.0 wt % of one or more dopants selected from the group consisting of B, Al, Li, Na, K, Mg, Ca, Nb, Ta, Mn, Cu and Sn; and the remainder $SiO_2$. In yet another embodiment, the glass contains 9.0 wt % to 16.0 wt % $TiO_2$; 1150 ppm to 1700 ppm OH; a combined concentration of 0.1 wt % to 7.0 wt % of one or more dopants selected from the group consisting of B, Al, Li, Na, K, Mg, Ca, Nb, Ta, Mn, Cu and Sn; and the remainder $SiO_2$.

In one embodiment, the glass contains 9.0 wt % to 16.0 wt % $TiO_2$; a combined concentration of 0.1 wt % to 7.0 wt % of one or more dopants selected from the group consisting of B, Al, Mg, Ca, Nb, Ta, Mn, Cu and Sn; 900 ppm to 3000 ppm OH; and the remainder $SiO_2$. In another embodiment, the glass contains 9.0 wt % to 16.0 wt % $TiO_2$; 1000 ppm to 2000 ppm OH; a combined concentration of 0.1 wt % to 7.0 wt % of one or more dopants selected from the group consisting of B, Al, Mg, Ca, Nb, Ta, Mn, Cu and Sn; and the remainder $SiO_2$. In still another embodiment, the glass contains 9.0 wt % to 16.0 wt % $TiO_2$; 1100 ppm to 1800 ppm OH; a combined concentration of 0.1 wt % to 7.0 wt % of one or more dopants selected from the group consisting of B, Al, Mg, Ca, Nb, Ta, Mn, Cu and Sn; and the remainder $SiO_2$. In yet another embodiment, the glass contains 9.0 wt % to 16.0 wt % $TiO_2$; 1150 ppm to 1700 ppm OH; a combined concentration of 0.1 wt % to 7.0 wt % of one or more dopants selected from the group consisting of B, Al, Mg, Ca, Nb, Ta, Mn, Cu and Sn; and the remainder $SiO_2$.

In one embodiment, the glass contains 9.0 wt % to 16.0 wt % $TiO_2$; a combined concentration of 0.1 wt % to 2.0 wt % of one or more dopants selected from the group consisting of Li, Na, and K; 900 ppm to 3000 ppm OH; and the remainder $SiO_2$. In another embodiment, the glass contains 9.0 wt % to 16.0 wt % $TiO_2$; 1000 ppm to 2000 ppm OH; a combined concentration of 0.1 wt % to 2.0 wt % of one or more dopants selected from the group consisting of Li, Na, and K; and the remainder $SiO_2$. In still another embodiment, the glass contains 9.0 wt % to 16.0 wt % $TiO_2$; 1100 ppm to 1800 ppm OH; a combined concentration of 0.1 wt % to 2.0 wt % of one or more dopants selected from the group consisting of Li, Na, and K; and the remainder $SiO_2$. In yet another embodiment, the glass contains 9.0 wt % to 16.0 wt % $TiO_2$; 1150 ppm to 1700 ppm OH; a combined concentration of 0.1 wt % to 2.0 wt % of one or more dopants selected from the group consisting of Li, Na, and K; and the remainder $SiO_2$.

In one embodiment, the glass contains 9.5 wt % to 16.0 wt % $TiO_2$, a combined concentration of 0.1 to 7.0 wt % of one or more dopants selected from the group consisting of B, Al, Li, Na, K, Mg, Ca, Nb, Ta, Mn, Cu and Sn, 900 ppm to 3000 ppm OH, and the remainder $SiO_2$. In another embodiment, the glass contains 9.5 wt % to 16.0 wt % $TiO_2$; 1000 ppm to 2000 ppm OH; a combined concentration of 0.1 wt % to 7.0 wt % of one or more dopants selected from the group consisting of B, Al, Li, Na, K, Mg, Ca, Nb, Ta, Mn, Cu and Sn; and the remainder $SiO_2$. In still another embodiment, the glass contains 9.5 wt % to 16.0 wt % $TiO_2$; 1100 ppm to 1800 ppm OH; a combined concentration of 0.1 wt % to 7.0 wt % of one or more dopants selected from the group consisting of B, Al, Li, Na, K, Mg, Ca, Nb, Ta, Mn, Cu and Sn; and the remainder $SiO_2$. In yet another embodiment, the glass contains 9.5 wt % to 16.0 wt % $TiO_2$; 1150 ppm to 1700 ppm OH; a combined concentration of 0.1 wt % to 7.0 wt % of one or more dopants selected from the group consisting of B, Al, Li, Na, K, Mg, Ca, Nb, Ta, Mn, Cu and Sn; and the remainder $SiO_2$.

In one embodiment, the glass contains 9.5 wt % to 16.0 wt % $TiO_2$; a combined concentration of 0.1 wt % to 7.0 wt % of one or more dopants selected from the group consisting of B, Al, Mg, Ca, Nb, Ta, Mn, Cu and Sn; 900 ppm to 3000 ppm OH; and the remainder $SiO_2$. In another embodiment, the glass contains 9.5 wt % to 16.0 wt % $TiO_2$; 1000 ppm to 2000 ppm OH; a combined concentration of 0.1 wt % to 7.0 wt % of one or more dopants selected from the group consisting of B, Al, Mg, Ca, Nb, Ta, Mn, Cu and Sn; and the remainder $SiO_2$. In still another embodiment, the glass contains 9.5 wt % to 16.0 wt % $TiO_2$; 1100 ppm to 1800 ppm OH; a combined concentration of 0.1 wt % to 7.0 wt % of one or more dopants selected from the group consisting of B, Al, Mg, Ca, Nb, Ta, Mn, Cu and Sn; and the remainder $SiO_2$. In yet another embodiment, the glass contains 9.5 wt % to 16.0 wt % $TiO_2$; 1150 ppm to 1700 ppm OH; a combined concentration of 0.1 wt % to 7.0 wt % of one or more dopants selected from the group consisting of B, Al, Mg, Ca, Nb, Ta, Mn, Cu and Sn; and the remainder $SiO_2$.

In one embodiment, the glass contains 9.5 wt % to 16.0 wt % $TiO_2$; a combined concentration of 0.1 wt % to 2.0 wt % of one or more dopants selected from the group consisting of Li, Na, and K; 900 ppm to 3000 ppm OH; and the remainder $SiO_2$. In another embodiment, the glass contains 9.5 wt % to 16.0 wt % $TiO_2$; 1000 ppm to 2000 ppm OH; a combined concentration of 0.1 wt % to 2.0 wt % of one or more dopants selected from the group consisting of Li, Na, and K; and the remainder $SiO_2$. In still another embodiment, the glass contains 9.5 wt % to 16.0 wt % $TiO_2$; 1100 ppm to 1800 ppm OH; a combined concentration of 0.1 wt % to 2.0 wt % of one or more dopants selected from the group consisting of Li, Na, and K; and the remainder $SiO_2$. In yet another embodiment, the glass contains 9.5 wt % to 16.0 wt % $TiO_2$; 1150 ppm to 1700 ppm OH; a combined concentration of 0.1 wt % to 2.0 wt % of one or more dopants selected from the group consisting of Li, Na, and K; and the remainder $SiO_2$.

In one embodiment, the glass contains 10.0 wt % to 15.0 wt % $TiO_2$, a combined concentration of 0.1 wt % to 7.0 wt % of one or more dopants selected from the group consisting of B, Al, Li, Na, K, Mg, Ca, Nb, Ta, Mn, Cu and Sn, 900 ppm to 3000 ppm OH, and the remainder $SiO_2$. In another embodiment, the glass contains 10.0 wt % to 15.0 wt % $TiO_2$; 1000 ppm to 2000 ppm OH; a combined concentration of 0.1 wt % to 7.0 wt % of one or more dopants selected from the group consisting of B, Al, Li, Na, K, Mg, Ca, Nb, Ta, Mn, Cu and Sn; and the remainder $SiO_2$. In still another embodiment, the glass contains 10.0 wt % to 15.0 wt % $TiO_2$; 1100 ppm to 1800 ppm OH; a combined concentration of 0.1 wt % to 7.0 wt % of one or more dopants selected from the group consisting of B, Al, Li, Na, K, Mg, Ca, Nb, Ta, Mn, Cu and Sn; and the remainder $SiO_2$. In yet another embodiment, the glass contains 10.0 wt % to 15.0 wt % $TiO_2$; 1150 ppm to 1700 ppm OH; a combined concentration of 0.1 wt % to 7.0 wt % of one or more dopants selected from the group consisting of B, Al, Li, Na, K, Mg, Ca, Nb, Ta, Mn, Cu and Sn; and the remainder $SiO_2$.

In one embodiment, the glass contains 10.0 wt % to 15.0 wt % $TiO_2$; a combined concentration of 0.1 wt % to 7.0 wt % of one or more dopants selected from the group consisting of B, Al, Mg, Ca, Nb, Ta, Mn, Cu and Sn; 900 ppm to 3000 ppm OH; and the remainder $SiO_2$. In another embodiment, the glass contains 10.0 wt % to 15.0 wt % $TiO_2$; 1000 ppm to 2000 ppm OH; a combined concentration of 0.1 wt % to 7.0 wt % of one or more dopants selected from the group consisting of B, Al, Mg, Ca, Nb, Ta, Mn, Cu and Sn; and the remainder $SiO_2$. In still another embodiment, the glass contains 10.0 wt % to 15.0 wt % $TiO_2$; 1100 ppm to 1800 ppm OH; a combined concentration of 0.1 wt % to 7.0 wt % of one or more dopants selected from the group consisting of B, Al, Mg, Ca, Nb, Ta, Mn, Cu and Sn; and the remainder $SiO_2$. In yet another embodiment, the glass contains 10.0 wt % to 15.0 wt % $TiO_2$; 1150 ppm to 1700 ppm OH; a combined concentration of 0.1 wt % to 7.0 wt % of one or more dopants selected from the group consisting of B, Al, Mg, Ca, Nb, Ta, Mn, Cu and Sn; and the remainder $SiO_2$.

In one embodiment, the glass contains 10.0 wt % to 15.0 wt % $TiO_2$; a combined concentration of 0.1 wt % to 2.0 wt % of one or more dopants selected from the group consisting of Li, Na, and K; 900 ppm to 3000 ppm OH; and the remainder $SiO_2$. In another embodiment, the glass contains 10.0 wt % to 15.0 wt % $TiO_2$; 1000 ppm to 2000 ppm OH; a combined concentration of 0.1 wt % to 2.0 wt % of one or more dopants selected from the group consisting of Li, Na, and K; and the remainder $SiO_2$. In still another embodiment, the glass contains 10.0 wt % to 15.0 wt % $TiO_2$; 1100 ppm to 1800 ppm OH; a combined concentration of 0.1 wt % to 2.0 wt % of one or more dopants selected from the group consisting of Li, Na, and K; and the remainder $SiO_2$. In yet another embodiment, the glass contains 10.0 wt % to 15.0 wt % $TiO_2$; 1150 ppm to 1700 ppm OH; a combined concentration of 0.1 wt % to 2.0 wt % of one or more dopants selected from the group consisting of Li, Na, and K; and the remainder $SiO_2$.

In one embodiment, the glass contains 11.0 wt % to 14.0 wt % $TiO_2$, a combined concentration of 0.1 wt % to 7.0 wt % of one or more dopants selected from the group consisting of B, Al, Li, Na, K, Mg, Ca, Nb, Ta, Mn, Cu and Sn, 900 ppm to 3000 ppm OH, and the remainder $SiO_2$. In another embodiment, the glass contains 11.0 wt % to 14.0 wt % $TiO_2$; 1000 ppm to 2000 ppm OH; a combined concentration of 0.1 wt % to 7.0 wt % of one or more dopants selected from the group consisting of B, Al, Li, Na, K, Mg, Ca, Nb, Ta, Mn, Cu and Sn; and the remainder $SiO_2$. In still another embodiment, the glass contains 11.0 wt % to 14.0 wt % $TiO_2$; 1100 ppm to 1800 ppm OH; a combined concentration of 0.1 wt % to 7.0 wt % of one or more dopants selected from the group consisting of B, Al, Li, Na, K, Mg, Ca, Nb, Ta, Mn, Cu and Sn; and the remainder $SiO_2$. In yet another embodiment, the glass contains 11.0 wt % to 14.0 wt % $TiO_2$; 1150 ppm to 1700 ppm OH; a combined concentration of 0.1 wt % to 7.0 wt % of one or more dopants selected from the group consisting of B, Al, Li, Na, K, Mg, Ca, Nb, Ta, Mn, Cu and Sn; and the remainder $SiO_2$.

In one embodiment, the glass contains 11.0 wt % to 14.0 wt % $TiO_2$; a combined concentration of 0.1 wt % to 7.0 wt % of one or more dopants selected from the group consisting of B, Al, Mg, Ca, Nb, Ta, Mn, Cu and Sn; 900 ppm to 3000 ppm OH; and the remainder $SiO_2$. In another embodiment, the glass contains 11.0 wt % to 14.0 wt % $TiO_2$; 1000 ppm to 2000 ppm OH; a combined concentration of 0.1 wt % to 7.0 wt % of one or more dopants selected from the group consisting of B, Al, Mg, Ca, Nb, Ta, Mn, Cu and Sn; and the remainder $SiO_2$. In still another embodiment, the glass contains 11.0 wt % to 14.0 wt % $TiO_2$; 1100 ppm to 1800 ppm OH; a combined concentration of 0.1 wt % to 7.0 wt % of one or more dopants selected from the group consisting of B, Al, Mg, Ca, Nb, Ta, Mn, Cu and Sn; and the remainder $SiO_2$. In yet another embodiment, the glass contains 11.0 wt % to 14.0 wt % $TiO_2$; 1150 ppm to 1700 ppm OH; a combined concentration of 0.1 wt % to 7.0 wt % of one or more dopants selected from the group consisting of B, Al, Mg, Ca, Nb, Ta, Mn, Cu and Sn; and the remainder $SiO_2$.

In one embodiment, the glass contains 11.0 wt % to 14.0 wt % TiO$_2$; a combined concentration of 0.1 wt % to 2.0 wt % of one or more dopants selected from the group consisting of Li, Na, and K; 900 ppm to 3000 ppm OH; and the remainder SiO$_2$. In another embodiment, the glass contains 11.0 wt % to 14.0 wt % TiO$_2$; 1000 ppm to 2000 ppm OH; a combined concentration of 0.1 wt % to 2.0 wt % of one or more dopants selected from the group consisting of Li, Na, and K; and the remainder SiO$_2$. In still another embodiment, the glass contains 11.0 wt % to 14.0 wt % TiO$_2$; 1100 ppm to 1800 ppm OH; a combined concentration of 0.1 wt % to 2.0 wt % of one or more dopants selected from the group consisting of Li, Na, and K; and the remainder SiO$_2$. In yet another embodiment, the glass contains 11.0 wt % to 14.0 wt % TiO$_2$; 1150 ppm to 1700 ppm OH; a combined concentration of 0.1 wt % to 2.0 wt % of one or more dopants selected from the group consisting of Li, Na, and K; and the remainder SiO$_2$.

In one embodiment, the glass contains 9.0 wt % to 16.0 wt % TiO$_2$; a combined concentration of 0.2 wt % to 5.0 wt % of one or more dopants selected from the group consisting of B, Al, Li, Na, K, Mg, Ca, Nb, Ta, Mn, Cu and Sn; 900 ppm to 3000 ppm OH; and the remainder SiO$_2$. In another embodiment, the glass contains 9.0 wt % to 16.0 wt % TiO$_2$; 1000 ppm to 2000 ppm OH; a combined concentration of 0.2 wt % to 5.0 wt % of one or more dopants selected from the group consisting of B, Al, Li, Na, K, Mg, Ca, Nb, Ta, Mn, Cu and Sn; and the remainder SiO$_2$. In still another embodiment, the glass contains 9.0 wt % to 16.0 wt % TiO$_2$; 1100 ppm to 1800 ppm OH; a combined concentration of 0.2 wt % to 5.0 wt % of one or more dopants selected from the group consisting of B, Al, Li, Na, K, Mg, Ca, Nb, Ta, Mn, Cu and Sn; and the remainder SiO$_2$. In yet another embodiment, the glass contains 9.0 wt % to 16.0 wt % TiO$_2$; 1150 ppm to 1700 ppm OH; a combined concentration of 0.2 wt % to 5.0 wt % of one or more dopants selected from the group consisting of B, Al, Li, Na, K, Mg, Ca, Nb, Ta, Mn, Cu and Sn; and the remainder SiO$_2$.

In one embodiment, the glass contains 9.0 wt % to 16.0 wt % TiO$_2$; a combined concentration of 0.2 wt % to 5.0 wt % of one or more dopants selected from the group consisting of B, Al, Mg, Ca, Nb, Ta, Mn, Cu and Sn; 900 ppm to 3000 ppm OH; and the remainder SiO$_2$. In another embodiment, the glass contains 9.0 wt % to 16.0 wt % TiO$_2$; 1000 ppm to 2000 ppm OH; a combined concentration of 0.2 wt % to 5.0 wt % of one or more dopants selected from the group consisting of B, Al, Mg, Ca, Nb, Ta, Mn, Cu and Sn; and the remainder SiO$_2$. In still another embodiment, the glass contains 9.0 wt % to 16.0 wt % TiO$_2$; 1100 ppm to 1800 ppm OH; a combined concentration of 0.2 wt % to 5.0 wt % of one or more dopants selected from the group consisting of B, Al, Mg, Ca, Nb, Ta, Mn, Cu and Sn; and the remainder SiO$_2$. In yet another embodiment, the glass contains 9.0 wt % to 16.0 wt % TiO$_2$; 1150 ppm to 1700 ppm OH; a combined concentration of 0.2 wt % to 5.0 wt % of one or more dopants selected from the group consisting of B, Al, Mg, Ca, Nb, Ta, Mn, Cu and Sn; and the remainder SiO$_2$.

In one embodiment, the glass contains 9.5 wt % to 16.0 wt % TiO$_2$; a combined concentration of 0.2 wt % to 5.0 wt % of one or more dopants selected from the group consisting of B, Al, Li, Na, K, Mg, Ca, Nb, Ta, Mn, Cu and Sn; 900 ppm to 3000 ppm OH; and the remainder SiO$_2$. In another embodiment, the glass contains 9.5 wt % to 16.0 wt % TiO$_2$; 1000 ppm to 2000 ppm OH; a combined concentration of 0.2 wt % to 5.0 wt % of one or more dopants selected from the group consisting of B, Al, Li, Na, K, Mg, Ca, Nb, Ta, Mn, Cu and Sn; and the remainder SiO$_2$. In still another embodiment, the glass contains 9.5 wt % to 16.0 wt % TiO$_2$; 1100 ppm to 1800 ppm OH; a combined concentration of 0.2 wt % to 5.0 wt % of one or more dopants selected from the group consisting of B, Al, Li, Na, K, Mg, Ca, Nb, Ta, Mn, Cu and Sn; and the remainder SiO$_2$. In yet another embodiment, the glass contains 9.5 wt % to 16.0 wt % TiO$_2$; 1150 ppm to 1700 ppm OH; a combined concentration of 0.2 wt % to 5.0 wt % of one or more dopants selected from the group consisting of B, Al, Li, Na, K, Mg, Ca, Nb, Ta, Mn, Cu and Sn; and the remainder SiO$_2$.

In one embodiment, the glass contains 9.5 wt % to 16.0 wt % TiO$_2$; a combined concentration of 0.2 wt % to 5.0 wt % of one or more dopants selected from the group consisting of B, Al, Mg, Ca, Nb, Ta, Mn, Cu and Sn; 900 ppm to 3000 ppm OH; and the remainder SiO$_2$. In another embodiment, the glass contains 9.5 wt % to 16.0 wt % TiO$_2$; 1000 ppm to 2000 ppm OH; a combined concentration of 0.2 wt % to 5.0 wt % of one or more dopants selected from the group consisting of B, Al, Mg, Ca, Nb, Ta, Mn, Cu and Sn; and the remainder SiO$_2$. In still another embodiment, the glass contains 9.5 wt % to 16.0 wt % TiO$_2$; 1100 ppm to 1800 ppm OH; a combined concentration of 0.2 wt % to 5.0 wt % of one or more dopants selected from the group consisting of B, Al, Mg, Ca, Nb, Ta, Mn, Cu and Sn; and the remainder SiO$_2$. In yet another embodiment, the glass contains 9.5 wt % to 16.0 wt % TiO$_2$; 1150 ppm to 1700 ppm OH; a combined concentration of 0.2 wt % to 5.0 wt % of one or more dopants selected from the group consisting of B, Al, Mg, Ca, Nb, Ta, Mn, Cu and Sn; and the remainder SiO$_2$.

In one embodiment, the glass contains 10.0 wt % to 15.0 wt % TiO$_2$; a combined concentration of 0.2 wt % to 5.0 wt % of one or more dopants selected from the group consisting of B, Al, Li, Na, K, Mg, Ca, Nb, Ta, Mn, Cu and Sn; 900 ppm to 3000 ppm OH; and the remainder SiO$_2$. In another embodiment, the glass contains 10.0 wt % to 15.0 wt % TiO$_2$; 1000 ppm to 2000 ppm OH; a combined concentration of 0.2 wt % to 5.0 wt % of one or more dopants selected from the group consisting of B, Al, Li, Na, K, Mg, Ca, Nb, Ta, Mn, Cu and Sn; and the remainder SiO$_2$. In still another embodiment, the glass contains 10.0 wt % to 15.0 wt % TiO$_2$; 1100 ppm to 1800 ppm OH; a combined concentration of 0.2 wt % to 5.0 wt % of one or more dopants selected from the group consisting of B, Al, Li, Na, K, Mg, Ca, Nb, Ta, Mn, Cu and Sn; and the remainder SiO$_2$. In yet another embodiment, the glass contains 10.0 wt % to 15.0 wt % TiO$_2$; 1150 ppm to 1700 ppm OH; a combined concentration of 0.2 wt % to 5.0 wt % of one or more dopants selected from the group consisting of B, Al, Li, Na, K, Mg, Ca, Nb, Ta, Mn, Cu and Sn; and the remainder SiO$_2$.

In one embodiment, the glass contains 10.0 wt % to 15.0 wt % TiO$_2$; a combined concentration of 0.2 wt % to 5.0 wt % of one or more dopants selected from the group consisting of B, Al, Mg, Ca, Nb, Ta, Mn, Cu and Sn; 900 ppm to 3000 ppm OH; and the remainder SiO$_2$. In another embodiment, the glass contains 10.0 wt % to 15.0 wt % TiO$_2$; 1000 ppm to 2000 ppm OH; a combined concentration of 0.2 wt % to 5.0 wt % of one or more dopants selected from the group consisting of B, Al, Mg, Ca, Nb, Ta, Mn, Cu and Sn; and the remainder SiO$_2$. In still another embodiment, the glass contains 10.0 wt % to 15.0 wt % TiO$_2$; 1100 ppm to 1800 ppm OH; a combined concentration of 0.2 wt % to 5.0 wt % of one or more dopants selected from the group consisting of B, Al, Mg, Ca, Nb, Ta, Mn, Cu and Sn; and the remainder SiO$_2$. In yet another embodiment, the glass contains 10.0 wt % to 15.0 wt % TiO$_2$; 1150 ppm to 1700 ppm OH; a combined concentration of 0.2 wt % to 5.0 wt % of one or more dopants selected from the group consisting of B, Al, Mg, Ca, Nb, Ta, Mn, Cu and Sn; and the remainder $SiO_2$.

In one embodiment, the glass contains 11.0 wt % to 14.0 wt % $TiO_2$; a combined concentration of 0.2 wt % to 5.0 wt % of one or more dopants selected from the group consisting of B, Al, Li, Na, K, Mg, Ca, Nb, Ta, Mn, Cu and Sn; 900 ppm to 3000 ppm OH; and the remainder $SiO_2$. In another embodiment, the glass contains 11.0 wt % to 14.0 wt % $TiO_2$; 1000 ppm to 2000 ppm OH; a combined concentration of 0.2 wt % to 5.0 wt % of one or more dopants selected from the group consisting of B, Al, Li, Na, K, Mg, Ca, Nb, Ta, Mn, Cu and Sn; and the remainder $SiO_2$. In still another embodiment, the glass contains 11.0 wt % to 14.0 wt % $TiO_2$; 1100 ppm to 1800 ppm OH; a combined concentration of 0.2 wt % to 5.0 wt % of one or more dopants selected from the group consisting of B, Al, Li, Na, K, Mg, Ca, Nb, Ta, Mn, Cu and Sn; and the remainder $SiO_2$. In yet another embodiment, the glass contains 11.0 wt % to 14.0 wt % $TiO_2$; 1150 ppm to 1700 ppm OH; a combined concentration of 0.2 wt % to 5.0 wt % of one or more dopants selected from the group consisting of B, Al, Li, Na, K, Mg, Ca, Nb, Ta, Mn, Cu and Sn; and the remainder $SiO_2$.

In one embodiment, the glass contains 11.0 wt % to 14.0 wt % $TiO_2$; a combined concentration of 0.2 wt % to 5.0 wt % of one or more dopants selected from the group consisting of B, Al, Mg, Ca, Nb, Ta, Mn, Cu and Sn; 900 ppm to 3000 ppm OH; and the remainder $SiO_2$. In another embodiment, the glass contains 11.0 wt % to 14.0 wt % $TiO_2$; 1000 ppm to 2000 ppm OH; a combined concentration of 0.2 wt % to 5.0 wt % of one or more dopants selected from the group consisting of B, Al, Mg, Ca, Nb, Ta, Mn, Cu and Sn; and the remainder $SiO_2$. In still another embodiment, the glass contains 11.0 wt % to 14.0 wt % $TiO_2$; 1100 ppm to 1800 ppm OH; a combined concentration of 0.2 wt % to 5.0 wt % of one or more dopants selected from the group consisting of B, Al, Mg, Ca, Nb, Ta, Mn, Cu and Sn; and the remainder $SiO_2$. In yet another embodiment, the glass contains 11.0 wt % to 14.0 wt % $TiO_2$; 1150 ppm to 1700 ppm OH; a combined concentration of 0.2 wt % to 5.0 wt % of one or more dopants selected from the group consisting of B, Al, Mg, Ca, Nb, Ta, Mn, Cu and Sn; and the remainder $SiO_2$.

In one embodiment, the glass contains 9.0 wt % to 16.0 wt % $TiO_2$; a combined concentration of 0.3 wt % to 3.0 wt % of one or more dopants selected from the group consisting of B, Al, Li, Na, K, Mg, Ca, Nb, Ta, Mn, Cu and Sn; 900 ppm to 3000 ppm OH; and the remainder $SiO_2$. In another embodiment, the glass contains 9.0 wt % to 16.0 wt % $TiO_2$; 1000 ppm to 2000 ppm OH; a combined concentration of 0.3 wt % to 3.0 wt % of one or more dopants selected from the group consisting of B, Al, Li, Na, K, Mg, Ca, Nb, Ta, Mn, Cu and Sn; and the remainder $SiO_2$. In still another embodiment, the glass contains 9.0 wt % to 16.0 wt % $TiO_2$; 1100 ppm to 1800 ppm OH; a combined concentration of 0.3 wt % to 3.0 wt % of one or more dopants selected from the group consisting of B, Al, Li, Na, K, Mg, Ca, Nb, Ta, Mn, Cu and Sn; and the remainder $SiO_2$. In yet another embodiment, the glass contains 9.0 wt % to 16.0 wt % $TiO_2$; 1150 ppm to 1700 ppm OH; a combined concentration of 0.3 wt % to 3.0 wt % of one or more dopants selected from the group consisting of B, Al, Li, Na, K, Mg, Ca, Nb, Ta, Mn, Cu and Sn; and the remainder $SiO_2$.

In one embodiment, the glass contains 9.0 wt % to 16.0 wt % $TiO_2$; a combined concentration of 0.3 wt % to 3.0 wt % of one or more dopants selected from the group consisting of B, Al, Mg, Ca, Nb, Ta, Mn, Cu and Sn; 900 ppm to 3000 ppm OH; and the remainder $SiO_2$. In another embodiment, the glass contains 9.0 wt % to 16.0 wt % $TiO_2$; 1000 ppm to 2000 ppm OH; a combined concentration of 0.3 wt % of one or more dopants selected from the group consisting of B, Al, Mg, Ca, Nb, Ta, Mn, Cu and Sn; and the remainder $SiO_2$. In still another embodiment, the glass contains 9.0 wt % to 16.0 wt % $TiO_2$; 1100 ppm to 1800 ppm OH; a combined concentration of 0.3 wt % to 3.0 wt % of one or more dopants selected from the group consisting of B, Al, Mg, Ca, Nb, Ta, Mn, Cu and Sn; and the remainder $SiO_2$. In yet another embodiment, the glass contains 9.0 wt % to 16.0 wt % $TiO_2$; 1150 ppm to 1700 ppm OH; a combined concentration of 0.3 wt % to 3.0 wt % of one or more dopants selected from the group consisting of B, Al, Mg, Ca, Nb, Ta, Mn, Cu and Sn; and the remainder $SiO_2$.

In one embodiment, the glass contains 9.5 wt % to 16.0 wt % $TiO_2$; a combined concentration of 0.3 wt % to 3.0 wt % of one or more dopants selected from the group consisting of B, Al, Li, Na, K, Mg, Ca, Nb, Ta, Mn, Cu and Sn; 900 ppm to 3000 ppm OH; and the remainder $SiO_2$. In another embodiment, the glass contains 9.5 wt % to 16.0 wt % $TiO_2$; 1000 ppm to 2000 ppm OH; a combined concentration of 0.3 wt % to 3.0 wt % of one or more dopants selected from the group consisting of B, Al, Li, Na, K, Mg, Ca, Nb, Ta, Mn, Cu and Sn; and the remainder $SiO_2$. In still another embodiment, the glass contains 9.5 wt % to 16.0 wt % $TiO_2$; 1100 ppm to 1800 ppm OH; a combined concentration of 0.3 wt % to 3.0 wt % of one or more dopants selected from the group consisting of B, Al, Li, Na, K, Mg, Ca, Nb, Ta, Mn, Cu and Sn; and the remainder $SiO_2$. In yet another embodiment, the glass contains 9.5 wt % to 16.0 wt % $TiO_2$; 1150 ppm to 1700 ppm OH; a combined concentration of 0.3 wt % to 3.0 wt % of one or more dopants selected from the group consisting of B, Al, Li, Na, K, Mg, Ca, Nb, Ta, Mn, Cu and Sn; and the remainder $SiO_2$.

In one embodiment, the glass contains 9.5 wt % to 16.0 wt % $TiO_2$; a combined concentration of 0.3 wt % to 3.0 wt % of one or more dopants selected from the group consisting of B, Al, Mg, Ca, Nb, Ta, Mn, Cu and Sn; 900 ppm to 3000 ppm OH; and the remainder $SiO_2$. In another embodiment, the glass contains 9.5 wt % to 16.0 wt % $TiO_2$; 1000 ppm to 2000 ppm OH; a combined concentration of 0.3 wt % to 3.0 wt % of one or more dopants selected from the group consisting of B, Al, Mg, Ca, Nb, Ta, Mn, Cu and Sn; and the remainder $SiO_2$. In still another embodiment, the glass contains 9.5 wt % to 16.0 wt % $TiO_2$; 1100 ppm to 1800 ppm OH; a combined concentration of 0.3 wt % to 3.0 wt % of one or more dopants selected from the group consisting of B, Al, Mg, Ca, Nb, Ta, Mn, Cu and Sn; and the remainder $SiO_2$. In yet another embodiment, the glass contains 9.5 wt % to 16.0 wt % $TiO_2$; 1150 ppm to 1700 ppm OH; a combined concentration of 0.3 wt % to 3.0 wt % of one or more dopants selected from the group consisting of B, Al, Mg, Ca, Nb, Ta, Mn, Cu and Sn; and the remainder $SiO_2$.

In one embodiment, the glass contains 10.0 wt % to 15.0 wt % $TiO_2$; a combined concentration of 0.3 wt % to 3.0 wt % of one or more dopants selected from the group consisting of B, Al, Li, Na, K, Mg, Ca, Nb, Ta, Mn, Cu and Sn; 900 ppm to 3000 ppm OH; and the remainder $SiO_2$. In another embodiment, the glass contains 10.0 wt % to 15.0 wt % $TiO_2$; 1000 ppm to 2000 ppm OH; a combined concentration of 0.3 wt % to 3.0 wt % of one or more dopants selected from the group consisting of B, Al, Li, Na, K, Mg, Ca, Nb, Ta, Mn, Cu and Sn; and the remainder $SiO_2$. In still another embodiment, the glass contains 10.0 wt % to 15.0 wt % $TiO_2$; 1100 ppm to 1800 ppm OH; a combined concentration of 0.3 wt % to 3.0 wt % of one or more dopants selected from the group consisting of B, Al, Li, Na, K, Mg, Ca, Nb, Ta, Mn, Cu and Sn; and the remainder $SiO_2$. In yet another embodiment, the glass contains 10.0 wt % to 15.0 wt % $TiO_2$; 1150 ppm to 1700 ppm OH; a combined concentration of 0.3 wt % to 3.0 wt % of one or more dopants selected from the group consisting of B, Al, Li, Na, K, Mg, Ca, Nb, Ta, Mn, Cu and Sn; and the remainder $SiO_2$.

In one embodiment, the glass contains 10.0 wt % to 15.0 wt % $TiO_2$; a combined concentration of 0.3 wt % to 3.0 wt % of one or more dopants selected from the group consisting of B, Al, Mg, Ca, Nb, Ta, Mn, Cu and Sn; 900 ppm to 3000 ppm OH; and the remainder $SiO_2$. In another embodiment, the glass contains 10.0 wt % to 15.0 wt % $TiO_2$; 1000 ppm to 2000 ppm OH; a combined concentration of 0.3 wt % to 3.0 wt % of one or more dopants selected from the group consisting of B, Al, Mg, Ca, Nb, Ta, Mn, Cu and Sn; and the remainder $SiO_2$. In still another embodiment, the glass contains 10.0 wt % to 15.0 wt % $TiO_2$; 1100 ppm to 1800 ppm OH; a combined concentration of 0.3 wt % to 3.0 wt % of one or more dopants selected from the group consisting of B, Al, Mg, Ca, Nb, Ta, Mn, Cu and Sn; and the remainder $SiO_2$. In yet another embodiment, the glass contains 10.0 wt % to 15.0 wt % $TiO_2$; 1150 ppm to 1700 ppm OH; a combined concentration of 0.3 wt % to 3.0 wt % of one or more dopants selected from the group consisting of B, Al, Mg, Ca, Nb, Ta, Mn, Cu and Sn; and the remainder $SiO_2$.

In one embodiment, the glass contains 11.0 wt % to 14.0 wt % $TiO_2$; a combined concentration of 0.3 wt % to 3.0 wt % of one or more dopants selected from the group consisting of B, Al, Li, Na, K, Mg, Ca, Nb, Ta, Mn, Cu and Sn; 900 ppm to 3000 ppm OH; and the remainder $SiO_2$. In another embodiment, the glass contains 11.0 wt % to 14.0 wt % $TiO_2$; 1000 ppm to 2000 ppm OH; a combined concentration of 0.3 wt % to 3.0 wt % of one or more dopants selected from the group consisting of B, Al, Li, Na, K, Mg, Ca, Nb, Ta, Mn, Cu and Sn; and the remainder $SiO_2$. In still another embodiment, the glass contains 11.0 wt % to 14.0 wt % $TiO_2$; 1100 ppm to 1800 ppm OH; a combined concentration of 0.3 wt % to 3.0 wt % of one or more dopants selected from the group consisting of B, Al, Li, Na, K, Mg, Ca, Nb, Ta, Mn, Cu and Sn; and the remainder $SiO_2$. In yet another embodiment, the glass contains 11.0 wt % to 14.0 wt % $TiO_2$; 1150 ppm to 1700 ppm OH; a combined concentration of 0.3 wt % to 3.0 wt % of one or more dopants selected from the group consisting of B, Al, Li, Na, K, Mg, Ca, Nb, Ta, Mn, Cu and Sn; and the remainder $SiO_2$.

In one embodiment, the glass contains 11.0 wt % to 14.0 wt % $TiO_2$; a combined concentration of 0.3 wt % to 3.0 wt % of one or more dopants selected from the group consisting of B, Al, Mg, Ca, Nb, Ta, Mn, Cu and Sn; 900 ppm to 3000 ppm OH; and the remainder $SiO_2$. In another embodiment, the glass contains 11.0 wt % to 14.0 wt % $TiO_2$; 1000 ppm to 2000 ppm OH; a combined concentration of 0.3 wt % to 3.0 wt % of one or more dopants selected from the group consisting of B, Al, Mg, Ca, Nb, Ta, Mn, Cu and Sn; and the remainder $SiO_2$. In still another embodiment, the glass contains 11.0 wt % to 14.0 wt % $TiO_2$; 1100 ppm to 1800 ppm OH; a combined concentration of 0.3 wt % to 3.0 wt % of one or more dopants selected from the group consisting of B, Al, Mg, Ca, Nb, Ta, Mn, Cu and Sn; and the remainder $SiO_2$. In yet another embodiment, the glass contains 11.0 wt % to 14.0 wt % $TiO_2$; 1150 ppm to 1700 ppm OH; a combined concentration of 0.3 wt % to 3.0 wt % of one or more dopants selected from the group consisting of B, Al, Mg, Ca, Nb, Ta, Mn, Cu and Sn; and the remainder $SiO_2$.

The enhanced hydroxyl content of the modified titania-silica glasses can be achieved in a steam consolidation process. In a typical process, a soot blank is prepared and subsequently consolidated in steam. The soot blank may be formed from undoped titania-silica soot or titania-silica soot containing one or more dopants. The consolidated soot blank is subsequently annealed and cooled to provide the glass.

Preparation of the soot blank is not limited to a particular process. The soot blank can be made by many preparation techniques including, but not limited to, sol-gel, gel casting, soot pressing (wet or dry), batching, pyrolysis, spray pyrolysis, outside vapor deposition, axial vapor deposition, the direct process, plasma process, chemical vapor deposition, and other processes known in the art. Optional doping can be accomplished in many ways, such as by adding a doping precursor to a sol-gel slurry before gelation or spray drying, during laydown in an OVD/AVD process or the direct process or by providing a doping precursor during consolidation. A doped titania-silica soot can also be prepared by flame hydrolysis or oxidation of mixed vapors of precursors for the dopant, Ti and Si. This soot can then be shaped in to an article by axial pressing, radial pressing or cold isostatic pressing.

Among the methods for forming the soot blank are:

(1) The OVD (outside vapor deposition) process, in which a soot blank is made in a burner by the combustion of a silica precursor, a titania precursor, and optionally one or more doping precursors and the soot is collected on a mandrel. Alternatively, the doping precursor may be excluded from the combustion process and provided during consolidation to form a doped titania-silica glass.

(2) Soot pressing of a soot made by the combustion of a silica precursor, a titania precursor, and optionally one or more doping precursors in a burner. Alternatively, the one or more doping precursors may be provided during the consolidation phase instead of being included during the combustion phase.

(3) A sol gel process in which titania-silica soot is made into a sol using a solvent in which optionally one or more doping precursors are dissolved or dispersed and formed into a shape by gelation of the sol and dried to form porous doped or undoped titania-silica articles that are then consolidated. In another embodiment, the soot used in the sol gel process is one in which the one or more doping precursors are added during the formation of the titania-silica soot as described above in Item (2). The doping precursor(s) may alternatively be provided during the sol phase of the preparation and may participate in the gelation reaction to form a porous doped titania-silica article.

Representative silicon precursors for burner processes include $SiCl_4$ and OMCTS (octamethylcyclotetrasiloxane). Representative titanium precursors for burner processes include $TiCl_4$ and titanium tetraisopropoxide. Representative doping precursors for burner processes include tri-isopropyl borate, triethyl borate, trimethyl borate, alkoxides of alkali metals (e.g. Li, Na, K), alkaline earth metals (e.g. Ca, Mg), transition metals (e.g. Mn, Ta, Nb, Cu), and post-transition metals (e.g. Al, Sn).

Representative precursors for silicon, titanium, and dopants in sol-gel processes include alkoxides. Examples include $Si(OCH_3)_4$, $Si(OC_2H_5)_4$, $Si(OR)_4$ (R is an alkyl group), $Ti(OR)_4$, and, $M(OR)_x$, where R is an alkyl group, M is a metal, and x is an integer corresponding to the coordination number of the metal.

The soot blank is processed to form the glasses of the present disclosure. Processing includes thermal treatment of the soot blank in a steam-free atmosphere, exposing the thermally treated soot blank to steam, consolidation of the thermally treated soot blank in a steam-containing atmosphere, and annealing.

Thermal treatment in a steam-free atmosphere enables purging and removal of gases from the blank and is preferably completed before exposing the soot blank to steam. Thermal treatment in the absence of steam may occur in an atmosphere that includes an inert gas. Thermal treatment in the absence of steam may occur in a steam-free atmosphere at a temperature in the range from 100° C. to 900° C., or in the range from 200° C. to 700° C., or in the range from 300° C. to 600° C. Thermal treatment in the steam-free atmosphere may occur for a time sufficient to increase the internal temperature of the soot blank to at least 100° C., or at least 200° C., or in the range from 100° C. to 600° C., or in the range from 100° C. to 500° C., or in the range from 100° C. to 400° C., or in the range from 100° C. to 300° C., or in the range from 150° C. to 600° C., or in the range from 150° C. to 500° C., or in the range from 150° C. to 400° C., or in the range from 150° C. to 300° C., or in the range from 200° C. to 600° C., or in the range from 200° C. to 500° C., or in the range from 200° C. to 400° C., or in the range from 200° C. to 300° C. As used herein, internal temperature refers to the temperature of the soot blank itself, which may differ from the nominal furnace temperature or the temperature of the atmosphere in which the soot blank is located.

After thermal treatment in the steam-free atmosphere, the soot blank is exposed to a steam-containing atmosphere to load the soot blank with hydroxyl (OH) groups. The steam-containing atmosphere for hydroxyl loading may include only steam or steam in combination with other gases. Other gases may include He and/or $O_2$. When present, the partial pressure of $O_2$ in the steam-containing hydroxyl loading atmosphere is less than 0.2 atm, or less than 0.1 atm, or less than 0.05 atm, or less than 0.02 atm. Maintaining a low concentration of $O_2$ inhibits formation of voids (entrapped gases) in the blank during the consolidation process.

When the steam-containing hydroxyl loading atmosphere includes only steam, the pressure of steam may be up to 10 atmosphere, such as a pressure of 0.1 atm to 10 atm, or a pressure of 0.5 atm to 5.0 atm, or a pressure of 0.7 atm to 2.5 atm, or a pressure of 0.9 to 1.3 atm. When the steam—containing hydroxyl loading atmosphere includes steam in combination with one or more other gases, the total pressure of the steam-containing hydroxyl loading atmosphere may be up to 10 atm, such as a total pressure of 10 atm or less, or a total pressure of 7.5 atm or less, or a total pressure of 5.0 atm or less, or a total pressure of 2.5 atm or less, or a total pressure of 1.5 atm or less, or a total pressure of 1.0 atm or less. When the steam-containing hydroxyl loading atmosphere includes steam in combination with other gases, the total pressure of the steam-containing hydroxyl loading atmosphere may be up to 10 atm and the partial pressure of steam may 0.1 atm to 9.5 atm, or 1.5 atm to 5.0 atm, or 0.7 atm to 2.5 atm, or 0.9 to 1.3 atm. When the steam-containing hydroxyl atmosphere includes steam in combination with other gases, the steam-containing hydroxyl loading atmosphere may include at least 10 vol % steam, or at least 25 vol % steam, or at least 50 vol % steam, or at least 75 vol % steam, or at least 90 vol % steam, or 90 vol % to 99 vol % steam. In one embodiment, the steam-containing hydroxyl loading atmosphere is at a pressure of up to 10 atm and includes at least 10 vol % steam. In another embodiment, the steam-containing hydroxyl loading atmosphere is at a pressure of up to 10 atm and includes at least 50 vol % steam. In still another embodiment, the steam-containing hydroxyl loading atmosphere is at a pressure of up to 10 atm and includes at least 75 vol % steam. In yet another embodiment, the steam-containing hydroxyl loading atmosphere is at a pressure of 0.9 atm to 1.3 atm and includes 90 vol % to 100 vol % steam.

The temperature at which the soot blank is exposed to the steam-containing hydroxyl loading atmosphere may in the range from 200° C. to 900° C., or in the range from 300° C. to 700° C. The temperature of exposure of the soot blank to the steam-containing hydroxyl loading atmosphere is preferably less than a temperature that induces densification or consolidation of the soot blank. The time of exposure of the soot blank to the steam-containing hydroxyl loading atmosphere may be adjusted to control the concentration of OH incorporated into the soot blank. Longer times of exposure lead to higher OH concentrations. It is also preferably to expose the soot blank to the steam-containing hydroxyl loading atmosphere for a time sufficiently long to provide uniformity of OH doping throughout the soot blank. The time of exposure to the steam-containing hydroxyl loading atmosphere at a temperature below 900° C. may be at least 0.5 hr, or at least 1 hr, or at least 2 hr, or at least 5 hr. The time of exposure to the steam-containing hydroxyl loading atmosphere at a temperature below 800° C. may be at least 0.5 hr, or at least 1 hr, or at least 2 hr, or at least 5 hr. The time of exposure to the steam-containing hydroxyl loading atmosphere at a temperature below 700° C. may be at least 0.5 hr, or at least 1 hr, or at least 2 hr, or at least 5 hr.

After exposure of the soot preform to the steam-containing hydroxyl loading atmosphere, the soot blank is consolidated in the presence of steam. The steam-containing consolidation atmosphere may have the same composition as the steam-containing hydroxyl loading atmosphere and may occur immediately after exposure of the soot blank to the steam-containing hydroxyl loading atmosphere. Consolidation leads to densification of the soot blank through closure of pores. Consolidation of the soot blank in the steam-containing consolidation atmosphere may occur at a temperature or temperature range for times sufficient to transform the soot blank from a porous body to a body having closed pores. In one embodiment, all pores are fully closed. The temperature of steam consolidation may be in the range from 900° C. to 1850° C., or in the range from 900° C. to 1700° C., or in the range from 900° C. to 1500° C., or in the range from 900° C. to 1300° C. The time of exposure of the soot blank to the steam-containing consolidation atmosphere may be at least 0.5 hr, or at least 1 hr, or at least 2 hr, or at least 5 hr.

In one embodiment, steam consolidation includes heating of the soot blank in a steam-containing consolidation atmosphere from 900° C. to 1500° C. at a rate between 0.5° C./min and 100° C./min and heating from 1500° C. to a temperature above 1600° C. at a rate of at least 0.5° C./min. In another embodiment, steam consolidation includes heating of the soot blank in a steam-containing consolidation atmosphere from 900° C. to 1500° C. at a rate between 3° C./min and 50° C./min and heating from 1500° C. to a temperature above 1600° C. at a rate of at least 3° C./min.

In still another embodiment, steam consolidation includes heating of the soot blank in a steam-containing consolidation atmosphere from 900° C. to 1300° C. at a rate between 0.5° C./min and 100° C./min and heating from 1300° C. to a temperature above 1400° C. at a rate of at least 0.5° C./min. In yet another embodiment, steam consolidation includes heating of the soot blank in a steam-containing consolidation atmosphere from 900° C. to 1300° C. at a rate between 3° C./min and 50° C./min and heating from 1300° C. to a temperature above 1400° C. at a rate of at least 3° C./min.

The steam consolidation may include holding the soot blank at a fixed temperature for a pre-determined period of time. The fixed temperature may be referred to herein as a holding temperature and the pre-determined period of time at which the soot blank is held at the holding temperature may be referred to herein as the holding time. In one embodiment, the holding temperature is a temperature between 1000° C. and 1200° C. and the holding time is at least 1 hr, or between 1 hr and 60 hr, or between 4 hr and 20 hr. In another embodiment, the holding temperature is a temperature between 1150° C. and 1200° C. and the holding time is at least 5 hr, or at least 10 hr, or between 5 hr and 60 hr, or between 10 hr and 60 hr. In embodiments including isothermal holds, the isothermal hold is followed by heating to a temperature of at least 1500° C. under the conditions described hereinabove to ensure full consolidation.

Steam consolidation converts the soot blank to a glass. After steam consolidation, the glass is annealed. The glass may be returned to room temperature after steam consolidation and before annealing. While at room temperature, the glass may be machined or otherwise processed before initiating the annealing process. The annealing atmosphere may be air, $N_2$, or an inert gas (e.g. He, Ar) and may or may not contain steam.

In one embodiment, annealing may include heating for at least one hour at an elevated temperature of at least 750° C., or at least 800° C., at least 850° C., or at least 900° C., or at least 950° C., or at least 1000° C. After heating at the elevated temperature, the glass may be cooled at a controlled rate between 0.1° C./hr and 30° C./hr, or between 0.2° C./hr and 20° C./hr, or between 0.3° C./hr and 10° C./hr, or between 0.3° C./hr and 5° C./hr, or between 0.1° C./hr and 5° C./hr, or between 0.1° C./hr and 3° C./hr, or between 0.1° C./hr and 1.5° C./hr to an intermediate temperature below 750° C., or below 650° C., or below 550° C. After cooling at a controlled rate to the intermediate temperature below 750° C., or below 650° C., or below 550° C., the glass may be cooled to an annealing endpoint temperature that is at least 50° C. below, or at least 100° C. below, or at least 150° C. below the intermediate temperature at a controlled rate between 1° C./hr and 50° C., or between 3° C./hr and 40° C./hr. After controlled cooling to the annealing endpoint temperature, the glass may be cooled to room temperature naturally. As used herein, natural cooling is cooling at an uncontrolled rate and may be accomplished, for example, by letting the glass cool unaided in air or an uncontrolled furnace.

In another embodiment, annealing may include heating the glass to an elevated temperature, cooling to an intermediate temperature, cooling from the intermediate temperature to an annealing endpoint temperature, and cooling naturally from the annealing endpoint temperature to room temperature. The elevated temperature may be a temperature of at least 750° C., or at least 800° C., or at least 850° C., or at least 900° C., or at least 950° C., or at least 1000° C. or a temperature between 750° C. and 1000° C., or a temperature between 800° C. and 950° C. The intermediate temperature is a temperature less than the elevated temperature. The intermediate temperature may be a temperature of at least 650° C., or at least 700° C., or at least 750° C., or at least 800° C., or at least 850° C. or at least 875° C., or a temperature between 650° C. and 875° C., or a temperature between 700° C. and 850° C., or a temperature between 750° C. and 800° C. The rate of cooling from the elevated temperature to the intermediate temperature may be at least 1.0° C./hr, or at least 0.2° C./hr, or at least 0.05° C./hr. The annealing endpoint temperature is a temperature below the intermediate temperature and greater than room temperature. The annealing endpoint temperature may be a temperature of at least 550° C., or at least 600° C., or at least 650° C., or at least 700° C., or at least 750° C., or a temperature between 550° C. and 750° C., or a temperature between 550° C. and 650° C., or a temperature between 600° C. and 700° C., or a temperature between 600° C. and 650° C., or a temperature between 650° C. and 700° C. Cooling from the intermediate temperature to the annealing endpoint temperature may occur at a rate of at least 10° C./hr, or at least 3° C./hr, or at least 1° C./hr. Cooling from the annealing endpoint temperature to room temperature may occur at the natural rate.

In one embodiment, annealing includes heating the consolidated glass to a temperature of 1050° C., holding the consolidated glass at 1050° C. for one hour or longer, cooling to 650° C. at a controlled rate of 30° C./hr or less, and cooling at an uncontrolled rate to room temperature.

Glasses formed with the compositions disclosed herein by the methods disclosed herein under the processing conditions disclosed herein have many desirable properties. In one embodiment, the glass has a zero crossover temperature ($T_{zc}$) between 0° C. and 120° C. and an expansivity slope equal to zero at a temperature between 20° C. and 90° C. In another embodiment, the glass has a zero crossover temperature ($T_{zc}$) between 0° C. and 100° C. and an expansivity slope equal to zero at a temperature between 15° C. and 70° C. In still another embodiment, the glass has a zero crossover temperature ($T_{zc}$) between 0° C. and 80° C. and an expansivity slope equal to zero at a temperature between 10° C. and 60° C. In yet another embodiment, the glass has a zero crossover temperature ($T_{zc}$) between 0° C. and 60° C. and an expansivity slope equal to zero at a temperature between 5° C. and 55° C.

In one embodiment, the glass has an expansivity slope at 20° C. less than 1 ppb/$K^2$. In another embodiment, the glass has an expansivity slope at 20° C. less than 0.8 ppb/$K^2$. In still another embodiment, the glass has an expansivity slope at 20° C. less than 0.6 ppb/$K^2$. In yet another embodiment, the glass has an expansivity slope at 20° C. less than 0.4 ppb/$K^2$. In a further embodiment, the glass has an expansivity slope at 20° C. less than 0.3 ppb/$K^2$.

In one embodiment, the glass has a coefficient of thermal expansion (CTE) at 20° C. of 0±50 ppb/K. In another embodiment, the glass has a coefficient of thermal expansion (CTE) at 20° C. of 0±30 ppb/K. In still another embodiment, the glass has a coefficient of thermal expansion (CTE) at 20° C. of 0±10 ppb/K. In yet another embodiment, the glass has a coefficient of thermal expansion (CTE) at 20° C. of 0±3 ppb/K.

In one embodiment, the glass has a fictive temperature ($T_f$) less than 850° C. In another embodiment, the glass has a fictive temperature ($T_f$) less than 800° C. In still another embodiment, the glass has a fictive temperature ($T_f$) less than 750° C. In yet another embodiment, the glass has a fictive temperature ($T_f$) less than 700° C.

In one embodiment, the glass has a fictive temperature of less than 825° C., a crossover temperature between 0° C. and 100° C., an expansivity slope equal to zero at a temperature between 10° C. and 95° C., and an expansivity slope at 20° C. less than 1.2 ppb/$K^2$.

In one embodiment, the glass has a fictive temperature of less than 750° C., a crossover temperature between 0° C. and 80° C., an expansivity slope equal to zero at a temperature between 10° C. and 60° C., and an expansivity slope at 20° C. less than 0.7 ppb/$K^2$.

In one embodiment, the glass has a fictive temperature of less than 700° C., a crossover temperature between 0° C. and 60° C., an expansivity slope equal to zero at a temperature between 10° C. and 45° C., and an expansivity slope at 20° C. less than 0.4 ppb/K$^2$.

In one embodiment, the glass has a fictive temperature of less than 825° C., a crossover temperature between 0° C. and 100° C., an expansivity slope equal to zero at a temperature between 10° C. and 95° C., and an expansivity slope at 20° C. less than 1.2 ppb/K$^2$.

In one embodiment, the glass has a fictive temperature of less than 750° C., a crossover temperature between 0° C. and 80° C., an expansivity slope equal to zero at a temperature between 10° C. and 60° C., and an expansivity slope at 20° C. less than 0.7 ppb/K$^2$.

In one embodiment, the glass has a fictive temperature of less than 700° C., a crossover temperature between 0° C. and 60° C., an expansivity slope equal to zero at a temperature between 10° C. and 45° C., and an expansivity slope at 20° C. less than 0.4 ppb/K$^2$.

In one embodiment, the glass has a fictive temperature of less than 825° C., a crossover temperature between 0° C. and 100° C., an expansivity slope equal to zero at a temperature between 10° C. and 95° C., and an expansivity slope at 20° C. less than 1.2 ppb/K$^2$.

In one embodiment, the glass has a fictive temperature of less than 750° C., a crossover temperature between 0° C. and 80° C., an expansivity slope equal to zero at a temperature between 10° C. and 60° C., and an expansivity slope at 20° C. less than 0.7 ppb/K$^2$.

In one embodiment, the glass has a fictive temperature of less than 700° C., a crossover temperature between 0° C. and 60° C., an expansivity slope equal to zero at a temperature between 10° C. and 45° C., and an expansivity slope at 20° C. less than 0.4 ppb/K$^2$.

In one embodiment, the glass has a fictive temperature of less than 825° C., a crossover temperature between 0° C. and 100° C., an expansivity slope equal to zero at a temperature between 10° C. and 95° C., and an expansivity slope at 20° C. less than 1.2 ppb/K$^2$.

In one embodiment, the glass has a fictive temperature of less than 750° C., a crossover temperature between 0° C. and 80° C., an expansivity slope equal to zero at a temperature between 10° C. and 60° C., and an expansivity slope at 20° C. less than 0.7 ppb/K$^2$.

In one embodiment, the glass has a fictive temperature of less than 700° C., a crossover temperature between 0° C. and 60° C., an expansivity slope equal to zero at a temperature between 10° C. and 45° C., and an expansivity slope at 20° C. less than 0.4 ppb/K$^2$.

In one embodiment, the glass has a fictive temperature of less than 825° C., a crossover temperature between 0° C. and 100° C., an expansivity slope equal to zero at a temperature between 10° C. and 95° C., and an expansivity slope at 20° C. less than 1.2 ppb/K$^2$.

In one embodiment, the glass has a fictive temperature of less than 750° C., a crossover temperature between 0° C. and 80° C., an expansivity slope equal to zero at a temperature between 10° C. and 60° C., and an expansivity slope at 20° C. less than 0.7 ppb/K$^2$.

In one embodiment, the glass has a fictive temperature of less than 700° C., a crossover temperature between 0° C. and 60° C., an expansivity slope equal to zero at a temperature between 10° C. and 45° C., and an expansivity slope at 20° C. less than 0.4 ppb/K$^2$.

Glasses in accordance with the present description also feature excellent spatial uniformity in $T_f$ and $T_{zc}$ throughout a volume of the glass. In one embodiment, $T_f$ of the glass varies from its mean value by less than ±5° C. throughout a volume of at least 100 cm$^3$. In another embodiment, $T_f$ of the glass varies from its mean value by less than ±2° C. throughout a volume of at least 100 cm$^3$. In still another embodiment, $T_f$ of the glass varies from its mean value by less than ±1° C. throughout a volume of at least 100 cm$^3$.

In one embodiment, $T_f$ of the glass varies from its mean value by less than ±5° C. throughout a volume of at least 400 cm$^3$. In another embodiment, $T_f$ of the glass varies from its mean value by less than ±2° C. throughout a volume of at least 400 cm$^3$. In still another embodiment, $T_f$ of the glass varies from its mean value by less than ±1° C. throughout a volume of at least 400 cm$^3$.

In one embodiment, $T_f$ of the glass varies from its mean value by less than ±5° C. throughout a volume of at least 5000 cm$^3$. In another embodiment, $T_f$ of the glass varies from its mean value by less than ±2° C. throughout a volume of at least 5000 cm$^3$. In still another embodiment, $T_f$ of the glass varies from its mean value by less than ±1° C. throughout a volume of at least 5000 cm$^3$.

In one embodiment, $T_{zc}$ of the glass varies from its mean value by less than ±2° C. throughout a volume of at least 100 cm$^3$. In another embodiment, $T_{zc}$ of the glass varies from its mean value by less than ±1° C. throughout a volume of at least 100 cm$^3$. In still another embodiment, $T_{zc}$ of the glass varies from its mean value by less than ±0.5° C. throughout a volume of at least 100 cm$^3$.

In one embodiment, $T_{zc}$ of the glass varies from its mean value by less than ±2° C. throughout a volume of at least 400 cm$^3$. In another embodiment, $T_{zc}$ of the glass varies from its mean value by less than ±1° C. throughout a volume of at least 400 cm$^3$. In still another embodiment, $T_{zc}$ of the glass varies from its mean value by less than ±0.5° C. throughout a volume of at least 400 cm$^3$.

In one embodiment, $T_{zc}$ of the glass varies from its mean value by less than ±2° C. throughout a volume of at least 5000 cm$^3$. In another embodiment, $T_{zc}$ of the glass varies from its mean value by less than ±1° C. throughout a volume of at least 5000 cm$^3$. In still another embodiment, $T_{zc}$ of the glass varies from its mean value by less than ±0.5° C. throughout a volume of at least 5000 cm$^3$.

The use of steam, optionally combined with one or more dopants as disclosed herein, offers many benefits including: (1) Seeds are avoided. The use of steam means that atmospheric pressure furnaces can be used without the use of costly helium gas or the need for vacuum consolidation furnaces; (2) Steam provides the benefit of high OH in the glass, which reduces viscosity and promotes low $T_f$ and low CTE slope. The use of steam in combination with one or more dopants may further reduce viscosity; (3) Steam provides a partial pressure of oxygen ($P_{O2}$) that minimizes Ti$^{3+}$ formation in titania-silica glasses. It is sometimes desirable to suppress formation of $Ti^{3+}$ because it acts to reduce transmission and is suspected to increase CTE; (4) Steam provides a low cost consolidation method. The $MoSi_2$ elements of conventional furnaces can tolerate steam and special enclosures (e.g. glass muffles) are not needed since the present glass compositions permit steam consolidation at ordinary pressures; (5) Steam is compatible with a wide variety of dopants and high OH glasses can be obtained for a variety of compositions; (6) Steam is compatible with most forming methods like OVD, VAD, PSD, sol-gel or gel casting, pressing or dry pressing and batching.

Example 1

A series of titania-silica glasses having a composition ~7.6 wt % $TiO_2$ and ~92.4 wt % $SiO_2$ and various hydroxyl (OH) concentrations were prepared and various properties of the glasses were examined. The soot blanks for the glasses were prepared by the OVD method in which $SiCl_4$ and $TiCl_4$ precursors were injected through a methane/oxygen flame and the flame was aimed at a rotating target. The flow rates of $TiCl_4$ and $SiCl_4$ were adjusted to obtain soot blanks with the composition ~7.6 wt % $TiO_2$ and ~92.4 wt % $SiO_2$. The burner was traversed back and forth to lay down $SiO_2$—$TiO_2$ soot onto the bait over the course of 6-8 hours to build up a preform of about 4-8 kg in weight.

A series of blanks consolidated in steam was prepared from the soot blanks using steam-containing consolidation atmospheres that differed in the partial pressure of water in order to obtain consolidated glasses that contained varying concentrations of OH. The partial pressure of water ($P_{H2O}$) used in the different steam-containing consolidation atmospheres is listed in Table 2 in absolute (atm) or relative (ppm, %) units. Steam-containing consolidation atmospheres 1-3 included 0.5 vol % $O_2$ and enough He to maintain a total pressure of 1 atm. $O_2$ was included to minimize or prevent formation of $Ti^{3+}$. Steam-containing consolidation atmosphere 4 was 100% steam at a pressure of 1 atm. Neither He nor $O_2$ was intentionally introduced to atmosphere 4.

TABLE 2

Steam Consolidation Conditions

| Consolidation Atmosphere | $P_{H2O}$ (atm) (absolute) | $P_{H2O}$ (relative) | Consolidation System |
|---|---|---|---|
| 1 | 20 × 10⁻⁶ | 20 ppm | Fiber Muffle |
| 2 | 4.5 × 10⁻³ | 4500 ppm | Fiber Muffle |
| 3 | 0.08 | 8% | Fiber Muffle |
| 4 | 1.0 | 100% | Platinum Box |

Consolidation atmospheres 1-3 were provided in a waveguide furnace. Water was introduced by bubbling some of the helium through a bubbler. The peak consolidation temperatures of atmospheres 1, 2, and 3 were 1450° C., 1440° C. and 1430° C., respectively. The blanks were translated through the hot zone of the waveguide furnace, allowed to cool to ~1200° C. in the furnace after exiting the hot zone, and removed from the furnace for cooling to room temperature. The consolidated glasses were then placed in a holding oven at ~1000° C. to outgas helium.

Steam consolidation atmosphere 4 (pure steam) was provided in a separate box furnace equipped with a vaporizer delivery system for supplying water. Deionized water was pumped through a rotameter at ~10 g/min (equivalent 12 slpm gas phase water) through a heated stainless steel coil. The water was then channeled into a coil within a furnace at ~500° C., where it was vaporized and transported through heated lines into a 7-liter platinum box placed in the box furnace. The platinum box contained the soot blank. The soot blank was first heated from room temperature to 250° C. and held at 250° C. for 60 min. During the 60 minute hold time, steam was turned on and equilibrated to a pressure of 1 atm. Next, the soot blank was heated from 250° C. to 1500° C. at a rate of 25° C./min and held at 1500° C. for 20 minutes. The steam was then turned off, a stream of nitrogen was turned on and the soot blank was cooled to room temperature.

The consolidated glasses obtained from soot blanks exposed to each of the consolidation atmospheres s were opaque and white or bluish white. The opaqueness and coloring were believed to be due to the presence of titania precipitates (white) and a low concentration of reduced titanium ($Ti^{3+}$) in the glass. The precipitates were melted by heating the glasses to about 1670° C. at a rate of 10° C./min in flowing nitrogen (with no hold time) followed by cooling down to ~1000° C. The glasses were then cooled from 1000° C. to 800° C. (blanks consolidated in atmospheres 1-3) or 700° C. (blanks consolidated in atmosphere 4) at controlled rates of 2° C./hr to 30° C./hr in order to examine the effect of cooling rate and OH concentration on $T_f$. Finally, the glasses were cooled to room temperature at a rate of 5° C./min. In some instances, the glasses were reheated to about 940° C. under flowing nitrogen within a tube furnace and held isothermally for periods between 5 hours and 8 days and then rapidly cooled.

OH concentration, fictive temperature, strain point, anneal point and CTE slope were determined for the glass samples. The OH concentration of the glass samples was measured using FTIR spectroscopy. The OH group has characteristic absorption bands near 3600 cm⁻¹ and 4500 cm⁻¹ in glasses with high silica content. Transmittance near the peak of the 3600 cm⁻¹ absorption band was measured and ratioed with a reference transmittance (at a non-absorbing wavelength near 4000 cm⁻¹ to account for background intensity). The transmittance ratio was used in conjunction with the Beer-Lambert law to obtain the OH concentration. The annealing point and strain point were measured by a bending beam viscosity technique. The technique measures the viscosity of a material. The strain point was defined to be the temperature at which the viscosity of the glass sample equaled $10^{14.7}$ Poise and the annealing point was defined to be the temperature at which the viscosity of the glass sample equaled $10^{13.2}$ Poise. Fictive temperature was measured using FTIR spectroscopy to monitor the peak position of an Si—O/Ti—O stretching overtone band near 2260 cm⁻¹. The peak position of the band has been correlated with the fictive temperature of titania-silica glasses. Further information on the method can be found in "ULE® Glass for EUVL Applications, a Fictive Temperature Correlation" by A. P. Carapella, C. A. Duran, K. E. Hrdina, D. J. Sears, and J. E. Tingley and published in J. Non-Crystalline Solids, vol. 367, 37-42 (2013).

FIG. 1 shows the dependence of strain point and anneal point on hydroxyl (OH) concentration for several of the titania-silica glasses. Strain point data are indicated with square symbols and anneal point data are indicated with diamond symbols. The dashed lines correspond to fits of the data. The results indicated that strain point and anneal point decrease with increasing hydroxyl content of the glass. FIG. 1 demonstrates that the viscosity characteristics of titania-silica glasses can be influenced through control of the hydroxyl concentration of the glasses.

Figure 2:
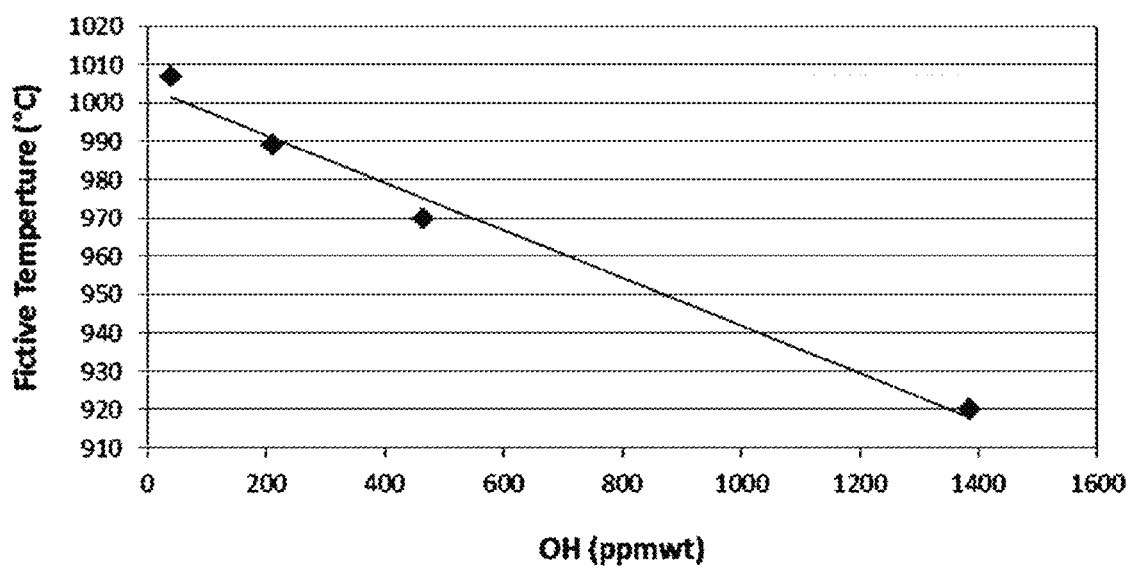
FIG. 2 shows the dependence of fictive temperature ($T_f$) on hydroxyl (OH) concentration for a series of titania-silica glasses cooled at 30° C./hr.

FIG. 2 shows the dependence of fictive temperature ($T_f$) on the hydroxyl concentration of the glasses. The results indicated that the fictive temperature decreased approximately linearly with increasing hydroxyl concentration. The results demonstrate the ability to control the fictive temperature of titania-silica glasses by controlling the hydroxyl concentration.

Figure 3:
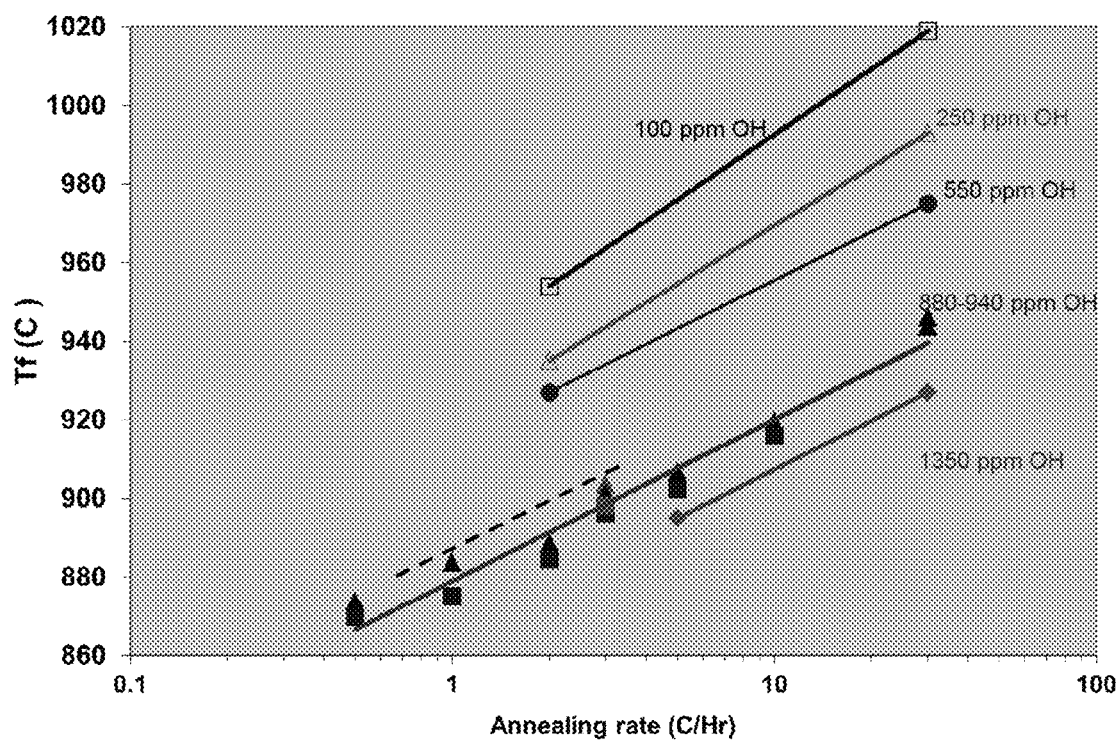
FIG. 3 shows the dependence of fictive temperature on the rate of cooling during annealing for a series of titania-silica glasses having various hydroxyl concentrations.

FIG. 3 shows the dependence of fictive temperature on the cooling rate during annealing for glass samples having hydroxyl concentrations ranging from 100 ppm to 1350 ppm. For a given cooling rate during annealing, glasses with higher hydroxyl concentration exhibited lower fictive temperatures. Regardless of hydroxyl concentration, a decrease in fictive temperature was observed as the rate of cooling during annealing was decreased. Slower cooling rates led to lower fictive temperatures. The data in FIG. 3 demonstrate that lower fictive temperatures are observed in glasses with higher hydroxyl concentration that are cooled more slowly during annealing.

Example 2

This example considers the dependence of CTE slope on fictive temperature. The glass samples for this example are based on commercially available Corning ULE® 7972 glass. The glass samples contained 7.4 wt % $TiO_2$ and 92.6 wt % $SiO_2$. The hydroxyl concentration of each sample was 880 ppm. The ULE® 7972 glass samples were obtained from the manufacturer (Corning, Inc.) and correspond to normal off-the-shelf glasses that are available for sale. One sample of ULE® 7972 glass was reserved in the condition received for use as a standard in the measurement of CTE slope described below. The ULE® 7972 glass standard had a known fictive temperature (900° C.) and a known CTE slope (1.60 ppb/$K^2$). Other samples of ULE® 7972 glass were subjected to an annealing treatment to lower the fictive temperature. Samples with different fictive temperatures were prepared by annealing samples of ULE® 7972 glass at temperatures above 900° C. for at least 1 hr, then cooling to 800° C. at different rates between 0.2° C./hr and 3° C./hr, followed by cooling at 30° C./hr to a temperature below 700° C., and then cooling naturally to room temperature.

CTE slope was measured for each annealed sample using the sandwich seal technique. The annealed samples were polished and assembled into sandwich seals with the ULE® 7972 glass standard. The ULE® 7972 glass standard served as a reference in the measurement of the CTE slope of the annealed samples. The ULE® 7972 glass standard was inserted between two pieces of each annealed sample to form a series of sandwich seals. The sandwich seal pieces were of approximate dimensions 1.25"×1"×⅛". The stress on the central ULE® 7972 glass standard piece of the sandwich seal exerted by the two surrounding pieces of annealed ULE® 7972 glass samples was measured as the sandwich was heated from −50° C. to +150° C. The difference in the CTE slope between the surrounding annealed ULE® 7972 pieces and the central ULE® 7972 glass standard piece was determined from the measured stress. Since the CTE slope of the ULE® 7972 glass standard was known, the CTE slope of the annealed ULE® 7972 glass samples could be determined.

Figure 4:
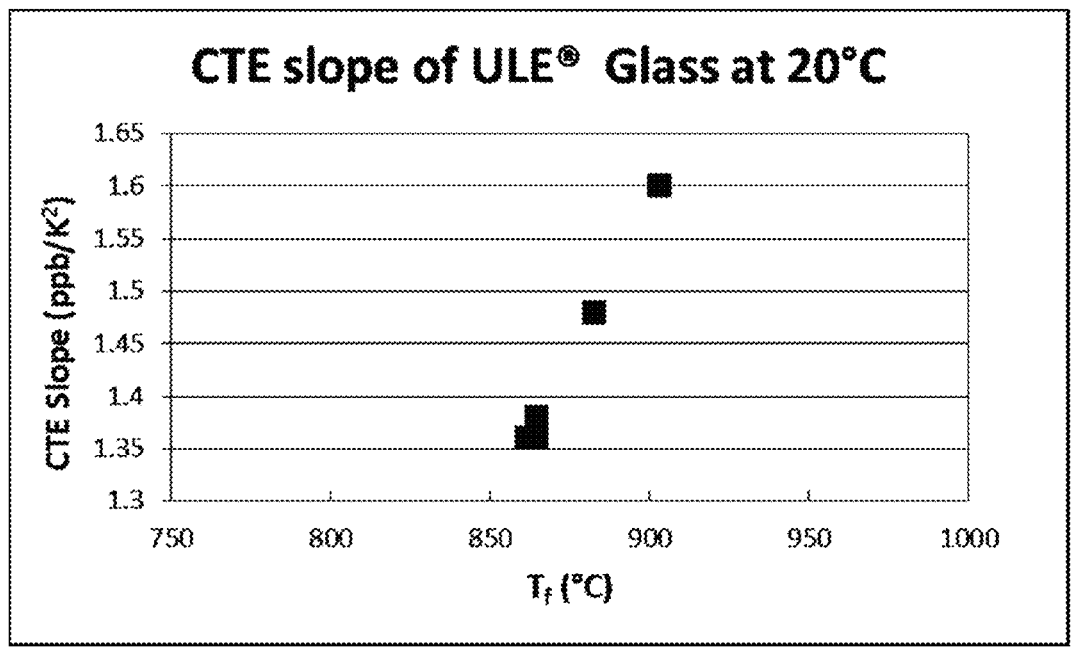
FIG. 4 shows the dependence of CTE slope on the fictive temperature of ULE® glass at 20° C.

FIG. 4 shows the variation in CTE slope of the ULE® 7972 glass samples with fictive temperature. The data point at $T_f$=900° C., CTE slope=1.6 ppb/$K^2$ corresponds to the ULE® 7972 glass standard and the remaining data points correspond to several annealed ULE® 7972 glass sample. The measurements indicated that CTE slope decreases with decreasing fictive temperature of the glass.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A glass comprising:
   9.0 wt % to 16.0 wt % $TiO_2$;
   84.0 wt % to 91.0 wt % $SiO_2$;
   900 ppm to 3000 ppm OH; and
   a combined concentration of 0.1 wt % to 7.0 wt % of one or more dopants selected from the group consisting of B, Al, Li, Na, K, Mg, Ca, Nb, Ta, Mn, Cu and Sn.

2. The glass of claim 1, wherein the glass comprises 9.5 wt % to 16.0 wt % $TiO_2$ and 84.0 wt % to 90.5 wt % $SiO_2$.

3. The glass of claim 2, wherein the glass comprises 1000 ppm to 2000 ppm OH.

4. The glass of claim 2, wherein the glass comprises 1150 ppm to 1700 ppm OH.

5. The glass of claim 1, wherein the glass has a fictive temperature of less than 825° C., a crossover temperature between 0° C. and 100° C., an expansivity slope equal to zero at a temperature between 10° C. and 95° C., and an expansivity slope at 20° C. less than 1.2 ppb/$K^2$.

6. The glass of claim 1, wherein the glass has a fictive temperature of less than 750° C., a crossover temperature between 0° C. and 80° C., an expansivity slope equal to zero at a temperature between 10° C. and 60° C., and an expansivity slope at 20° C. less than 0.7 ppb/$K^2$.

7. The glass of claim 1, wherein the glass has a fictive temperature of less than 700° C., a crossover temperature between 0° C. and 60° C., an expansivity slope equal to zero at a temperature between 10° C. and 45° C., and an expansivity slope at 20° C. less than 0.4 ppb/$K^2$.

8. The glass of claim 1, wherein the glass comprises 10.0 wt % to 15.0 wt % $TiO_2$ and 85.0 wt % to 90.0 wt % $SiO_2$.

9. The glass of claim 8, wherein the glass comprises 1000 ppm to 2000 ppm OH.

10. The glass of claim 8, wherein the glass comprises 1150 ppm to 1700 ppm OH.

11. The glass of claim 8, wherein the glass has a fictive temperature of less than 825° C., a crossover temperature between 0° C. and 100° C., an expansivity slope equal to zero at a temperature between 10° C. and 95° C., and an expansivity slope at 20° C. less than 1.2 ppb/$K^2$.

12. The glass of claim 8, wherein the glass has a fictive temperature of less than 750° C., a crossover temperature between 0° C. and 80° C., an expansivity slope equal to zero at a temperature between 10° C. and 60° C., and an expansivity slope at 20° C. less than 0.7 ppb/$K^2$.

13. The glass of claim 8, wherein the glass has a fictive temperature of less than 700° C., a crossover temperature between 0° C. and 60° C., an expansivity slope equal to zero at a temperature between 10° C. and 45° C., and an expansivity slope at 20° C. less than 0.4 ppb/K$^2$.

14. The glass of claim 1, wherein the glass comprises 11.0 wt % to 14.0 wt % TiO$_2$ and 86.0 wt % to 89.0 wt % SiO$_2$.

15. The glass of claim 14, wherein the glass comprises 1000 ppm to 2000 ppm OH.

16. The glass of claim 14, wherein the glass comprises 1150 ppm to 1700 ppm OH.

17. The glass of claim 14, wherein the glass has a fictive temperature of less than 825° C., a crossover temperature between 0° C. and 100° C., an expansivity slope equal to zero at a temperature between 10° C. and 95° C., and an expansivity slope at 20° C. less than 1.2 ppb/K$^2$.

18. The glass of claim 14, wherein the glass has a fictive temperature of less than 750° C., a crossover temperature between 0° C. and 80° C., an expansivity slope equal to zero at a temperature between 10° C. and 60° C., and an expansivity slope at 20° C. less than 0.7 ppb/K$^2$.

19. The glass of claim 14, wherein the glass has a fictive temperature of less than 700° C., a crossover temperature between 0° C. and 60° C., an expansivity slope equal to zero at a temperature between 10° C. and 45° C., and an expansivity slope at 20° C. less than 0.4 ppb/K$^2$.

* * * * *